United States Patent
Furuya

(10) Patent No.: US 7,882,289 B2
(45) Date of Patent: Feb. 1, 2011

(54) SLAVE APPARATUS IN A DATA TRANSMISSION SYSTEM, DATA TRANSMISSION SYSTEM AND DATA TRANSMISSION METHOD IN A DATA TRANSMISSION SYSTEM

(75) Inventor: Akiko Furuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 12/329,006

(22) Filed: Dec. 5, 2008

(65) Prior Publication Data

US 2009/0210596 A1 Aug. 20, 2009

(30) Foreign Application Priority Data

Feb. 15, 2008 (JP) .............................. 2008-034894

(51) Int. Cl.
*G06F 13/40* (2006.01)
(52) U.S. Cl. ...................................... 710/110; 710/106
(58) Field of Classification Search ......... 710/104–105, 710/110, 306, 311–317, 8–19, 106
See application file for complete search history.

(56) References Cited

U.S. PATENT DOCUMENTS

| 6,021,453 A * | 2/2000 | Klingman .................... 710/305 |
| 7,228,373 B2 * | 6/2007 | Daly et al. ................... 710/110 |
| 7,328,298 B2 * | 2/2008 | Kamakura et al. ........... 710/305 |
| 7,441,066 B2 * | 10/2008 | Bouchier et al. ............ 710/312 |
| 7,565,470 B2 * | 7/2009 | Lin ............................. 710/110 |
| 2005/0216631 A1 * | 9/2005 | Daly et al. ................... 710/110 |
| 2007/0255858 A1 * | 11/2007 | Hatte ............................ 710/3 |
| 2008/0052417 A1 * | 2/2008 | Aoyama et al. ................. 710/1 |
| 2008/0288662 A1 * | 11/2008 | Doorenbos ..................... 710/4 |
| 2009/0177823 A1 * | 7/2009 | Chao .......................... 710/110 |

FOREIGN PATENT DOCUMENTS

| JP | 62-271596 | 11/1987 |
| JP | 2-58944 | 2/1990 |
| JP | 5-145562 | 6/1993 |
| JP | 5-344137 | 12/1993 |

* cited by examiner

*Primary Examiner*—Raymond N Phan
(74) *Attorney, Agent, or Firm*—Fujitsu Patent Center

(57) ABSTRACT

In a data transmission system having a plurality of apparatuses connected to one another in a cascade, each slave apparatus has an identification number retention section retaining the same identification number as the other slave apparatuses, a receiver receiving data accompanied by an apparatus number, a judgment section judging that the data is destined for itself when the apparatus number coincides with the identification number, while judging that the data is destined for another slave apparatus when the apparatus number does not coincide with the identification number, and a transmitter changing the apparatus number by subtracting or adding when the data is judged to be destined for another slave apparatus, and transmitting the data to another lower-ranked slave apparatus. Thereby, data transmission can be accomplished without automatically setting an apparatus number to each of the plural apparatuses.

8 Claims, 12 Drawing Sheets

US 7,882,289 B2

SLAVE APPARATUS IN A DATA TRANSMISSION SYSTEM, DATA TRANSMISSION SYSTEM AND DATA TRANSMISSION METHOD IN A DATA TRANSMISSION SYSTEM

CROSS-REFERENCE TO RELATED APPLICATION(S)

This application is based upon and claims the benefit of priority of the prior Japanese Application No. 2008-034894, filed on Feb. 15, 2008 in Japan, the entire contents of which are hereby incorporated by reference.

FIELD

The present invention relates to a technique for transmitting/receiving data among a plurality of apparatuses in a data transmission system in which a plurality of apparatuses are connected to one another in a cascade.

BACKGROUND

In a data transmission system configured by connecting a plurality of apparatuses to one another in a cascade configuration (cascade connection) or in a data transmission system configured by connecting a plurality of apparatuses to one another in a ring configuration, it is necessary to set an apparatus number to each apparatus in order to transmit data among the plural apparatuses.

For example, in a known data transmission system 100 illustrated in FIG. 11, a plurality of slave apparatuses (denoted as "Slaves" 0 to 2 in the drawing) are connected in a cascade under the highest-ranked apparatus (denoted as "Master" in the drawing) functioning as a master apparatus.

In such data transmission system 100, each of the slave apparatuses 102 to 104 has to set its own apparatus number (address number) in the data transmission system 100.

By setting its own apparatus number in each of the slave apparatuses 102 to 104, each of the slave apparatuses 102 to 104 can confirm whether data transmitted from the master apparatus 101 is destined for itself or not, and can transfer data destined for another apparatus to the following slave apparatus 103 or 104.

There have been proposed techniques for automatically setting an apparatus number to each of a plurality of apparatuses in a data transmission system (refer to patent documents 1 to 4 below, for example).

As illustrated in FIG. 12, some techniques need an exclusive circuit 105 to 107 (denoted as "apparatus number automatically setting circuit" in the drawing) for automatically setting an apparatus number of its own slave apparatus 102, 103 or 104, for example.

[Patent Document 1] Japanese Patent Application Laid-Open Publication Number S62-271596

[Patent Document 2] Japanese Patent Application Laid-Open Publication Number H02-058944

[Patent Document 3] Japanese Patent Application Laid-Open Publication Number H05-344137

[Patent Document 4] Japanese Patent Application Laid-Open Publication Number H05-145562

According to the known techniques disclosed in the above patent documents, each of the slave apparatuses 102 to 104 has to always set its own apparatus number at the time of initial setting before data transmission, regardless of whether or not to require the exclusive circuit 105, 106 or 107 for automatically setting the apparatus number.

However, automatic setting of an apparatus number by each of the plural slave apparatuses 102 to 104 requires a considerable period of time, hence the larger the number of apparatuses configuring the data transmission system, the longer this period of time.

SUMMARY

The present invention provides a slave apparatus in a data transmission system in which a plurality of slave apparatuses which are lower-ranked apparatuses are connected to a master apparatus which is the highest-ranked apparatus in a cascade configuration, comprising an identification number retention section retaining the same identification number as other slave apparatuses, receiver receiving data to which an apparatus number specifying one of the plural slave apparatuses is added from the master apparatus or another slave apparatus connected to the higher-rank side of the slave apparatus, a judgment section judging that the data is destined for the slave apparatus itself when the apparatus number added to the data received by the receiver coincides with the identification number, whereas judging that the data is destined for another slave apparatus when the apparatus number does not coincide with the identification number, and a transmitter, when the judgment section judges that the data is destined for another slave apparatus, subtracting or adding a predetermined value from or to the apparatus number to change the apparatus number, adding the changed apparatus number to the data and transmitting the data to another slave apparatus connected to the lower-rank side of the slave apparatus.

The data transmission system is required to comprise the above-mentioned master apparatus and the above-mentioned slave apparatuses.

The present invention further provides a data transmission method in a data transmission system in which a plurality of slave apparatuses which are lower-ranked apparatuses are connected to a master apparatus which is the highest-ranked apparatus in a cascade configuration, comprising the steps of transmitting data to which an apparatus number specifying one of the plural slave apparatuses is added from the master apparatus to a slave apparatus connected to the lower-rank side of the master apparatus in order to transmit the data from the master apparatus to the one of the plural slave apparatuses, when the data is received by a slave apparatus from the master apparatus or another slave apparatus connected to the higher-rank side of the slave apparatus, judging in the slave apparatus that the data is destined for the slave apparatus itself if the apparatus number added to the received data coincides with the same identification number retained beforehand in the slave apparatus as the other slave apparatuses, whereas judging in the slave apparatus that the data is destined for another slave apparatus if the apparatus number does not coincide with the identification number, subtracting or adding a predetermined value from or to the apparatus number to change the apparatus number, adding the changed apparatus number to the data, and transmitting the data from the slave apparatus to another slave apparatus connected to the lower-rank side of the slave apparatus.

The present invention still further provides a data transmission method in a data transmission system in which a master apparatus and a plurality of slave apparatuses are connected in a ring configuration, comprising the steps of transmitting transmission data to which command information representing that the transmission data is data from the master apparatus and an apparatus number specifying one of the plural slave apparatuses are added from the master apparatus to either one of two slave apparatuses connected to the master apparatus in order to transmit the transmission data from the master apparatus to the one of the slave apparatuses, when the data is received by a slave apparatus from the master apparatus or another slave apparatus, judging in the slave apparatus that the transmission data is destined for the slave apparatus itself if the command information is added to the received data and the apparatus number coincides with the same identification number retained beforehand in the slave apparatus as the other slave apparatuses, whereas judging in the slave apparatus that the transmission data is destined for another slave apparatus if the command information is added to the data but the apparatus number does not coincide with the identification number, subtracting or adding a predetermined value from or to the apparatus number to change the apparatus number, adding the changed apparatus number to the transmission data, and transmitting the transmission data from the slave apparatus to a following slave apparatus.

Additional objects and advantages of the embodiment(s) will be set forth in part in the description which follows, and in part will be obvious from the description, or may be learned by practice of the embodiment(s). The object and advantages of the invention will be realized and attained by means of the elements and combinations particularly pointed out in the appended claims.

It is to be understood that both the foregoing general description and the following detailed description are exemplary and explanatory and are not restrictive of the embodiment, as claimed.

BRIEF DESCRIPTION OF THE DRAWING(S)

DESCRIPTION OF EMBODIMENT(S)

Hereinafter, description will be made of embodiments of the present invention with reference to the accompanying drawings.

[1] First Embodiment

Figure 1:
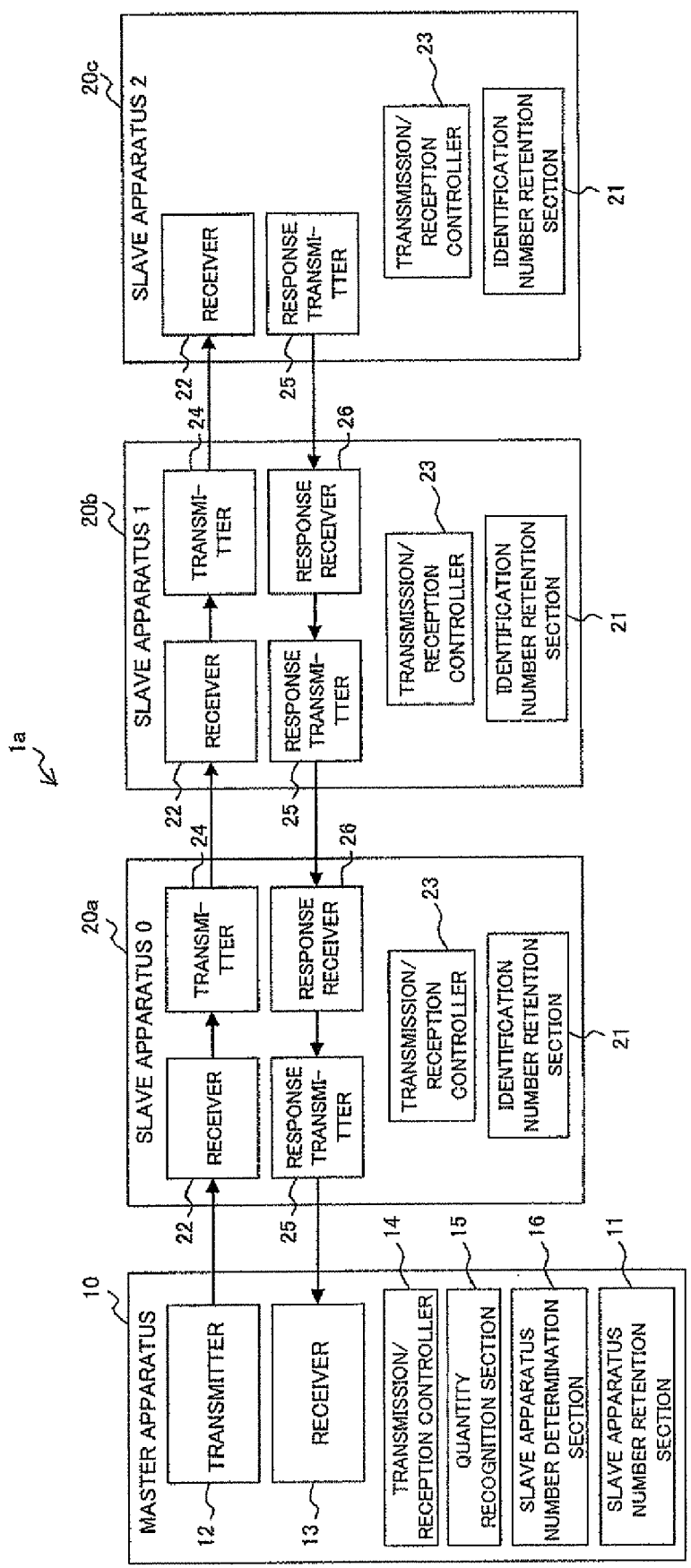
FIG. 1 is a block diagram illustrating functional configuration of a data transmission system according to a first embodiment of this invention.

FIG. 1 is a block diagram illustrating functional configuration of a data transmission system (hereinafter referred to as this data transmission system) $1a$ according to a first embodiment of this invention. As illustrated in FIG. 1, this data transmission system $1a$ is configured by connecting three or more (here four) apparatuses 10 and $20a$ to $20c$ are connected to one another in a cascade configuration (cascade connection).

In this data transmission system $1a$, an apparatus 10 functions as a master apparatus that is the highest-ranked apparatus. In relation to the master apparatus 10, the apparatuses $20a$ to $20c$ function as slave apparatuses (denoted as "slave apparatus 0", "slave apparatus 1" and "slave apparatus 2" in the drawing) that are lower-ranked apparatuses.

The master apparatus 10 corresponds to an apparatus performing data transmission/reception processing as the main processing, a control unit of a terminal having a predetermined function, or an information processing unit such as a personal computer or the like. The slave apparatuses $20a$ to $20c$ correspond to apparatuses similar to the master apparatus 10 when the master apparatus is an apparatus performing data transmission/reception processing as the main processing, or correspond to terminals having a predetermined function when the master apparatus 10 is a control unit, or correspond to apparatuses similar to the master apparatus 10 when the master apparatus 10 is an information processing unit such as a personal computer or the like.

Now, outline of this data transmission system $1a$ is explained. The master apparatus 10 is connected to the slave apparatus $20a$ so as to be able to transmit/receive data therebetween. The slave apparatus $20a$ is connected to the slave apparatus $20b$ so as to be able to transmit/receive data therebetween. The slave apparatus $20b$ is connected to the slave apparatus $20c$ so as to be able to transmit/receive data therebetween.

When the master apparatus 10 sends (transmits) data to the slave apparatus $20c$, for example, the data is transmitted to the slave apparatus $20c$ via the slave apparatus $20a$ and the slave apparatus $20b$.

Likewise, when the master apparatus 10 sends data to the slave apparatus $20b$, the data is transmitted to the slave apparatus $20b$ via the slave apparatus $20a$.

Data (for example, response data) from the slave apparatus $20c$ to the master apparatus 10 is transmitted via the slave apparatuses $20b$ and $20a$. Data from the slave apparatus $20b$ to the master apparatus 10 is transmitted via the slave apparatus $20a$.

The master apparatus 10 has a slave apparatus number retention section 11, transmitter 12, a receiver 13, a transmission/reception controller 14, a quantity recognition section 15 and a slave apparatus number determination section 16.

The slave apparatus number retention section 11 retains apparatus numbers that are address numbers of a plurality of the slave apparatuses $20a$ to $20c$ in this data transmission system $1a$.

Each of the apparatus numbers retained by the slave apparatus number retention section 11 is determined by the slave apparatus number determination section 16. The apparatus numbers retained by the slave apparatus number retention section 11 are "0" for the slave apparatus 20a, "1" for the slave apparatus 20b and "2" for the slave apparatus 20c.

The transmitter 12 transmits data to the lower-ranked slave apparatuses 20a to 20c. In concrete, when intending to transmit data to one of the plural slave apparatuses 20a to 20c (hereinafter referred to as a slave apparatus 20 when these slave apparatuses are not particularly discriminated from one another), the transmitter 12 transmits, under control of the transmission/reception controller 14, the data, to which an apparatus number specifying the relevant slave apparatus 20 as the destination is added, to the slave apparatus 20a connected to the master apparatus 10 on the basis of slave apparatus information retained in the slave apparatus number retention section 11.

The receiver 13 receives data transmitted from the slave apparatus 20a.

The transmission/reception controller 14 controls data transmission and reception to and from the slave apparatus 20, which is a lower-ranked apparatus, performed by the transmitter 12 and the receiver 13.

Meanwhile, details of the transmission/reception controller 14, the quantity recognition section 15 and the slave apparatus number determination section 16 will be described later with reference to FIGS. 3 and 4.

Next, the slave apparatuses 20a to 20c will be described. These slave apparatuses 20a to 20c have basically the same configuration.

Each of the slave apparatuses 20a to 20c has an identification number retention section 21, a receiver 22, a transmission/reception controller 23, a transmitter 24, a response transmitter 25 and a response receiver 26.

The slave apparatus 20c may have the transmitter 24 and the response receiver 26 like the slave apparatuses 20a and 20b although the transmitter 24 and the response receiver 26 are not illustrated in FIG. 1.

Since the slave apparatus 20c is in the lowest rank in this data transmission system 1a, the slave apparatus 20c does not need the transmitter 24 and the response receiver 26 used to transmit data to a slave apparatus lower than the slave apparatus 20c. For this, the transmitter 24 and the response receiver 26 are omitted in FIG. 1. The slave apparatus 20c dispenses with the transmitter 24 and the response receiver 26, as a matter of course.

The identification number retention section 21 retains the same identification number, for example, "0" as the other slave apparatuses 20.

In other words, the slave apparatuses 20a to 20c retain the same identification number in their identification number retention sections 21. This identification number is a default value, and the identification number retention section 21 does not need a function for changing the retained identification number.

The receiver 22 receives data transmitted from the higher-ranked apparatus.

In other words, the receiver 22 in the slave apparatus 20a receives data transmitted from the transmitter 12 of the master apparatus 10.

The receiver 22 in the slave apparatus 20b receives data transmitted from the transmitter 24 in the slave apparatus 20a.

The receiver 22 in the slave apparatus 20c receives data transmitted from the transmitter 24 in the slave apparatus 20b.

The transmission/reception controller 23 controls data transmission/reception by the receiver 22, the transmitter 24, the response transmitter 25 and the response receiver 26.

The transmission/reception controller 23 functions as a judgment section which judges whether the data is data transmitted from the master apparatus 10 to its own apparatus according to whether or not an apparatus number added to this data received by the receiver 22 is an identification number "0" retained in the identification number retention section 21.

In other words, when an apparatus number of data received by the receiver 22 is the identification number, that is, when these numbers coincide with each other, the transmission/reception controller 23 judges as the judgment section that this data is destined for itself.

When an apparatus number added to data received by the receiver 22 is not the identification number, that is, when these numbers do not coincide with each other, the transmission/reception controller 23 judges that this data is destined for not itself but another slave apparatus 20.

When judging that the data is destined for not itself but another slave apparatus 20, the transmission/reception controller 23 controls the transmitter 24 to add or subtract a predetermined value to or from the apparatus number (here, subtracting "1") to change the apparatus number, attach the changed apparatus number to the data, and transmit the data to the lower-ranked slave apparatus 20.

In other words, when the transmission/reception controller 23 judges as the judgment section that the data received by the receiver 22 is not destined for itself, the transmitter 24 changes the apparatus number attached to this data by subtracting or adding (here, subtracting "1") from or to the apparatus number, adds the changed apparatus number to the data, and transmits the same to another slave apparatus 20 in the lower rank.

Figure 2:
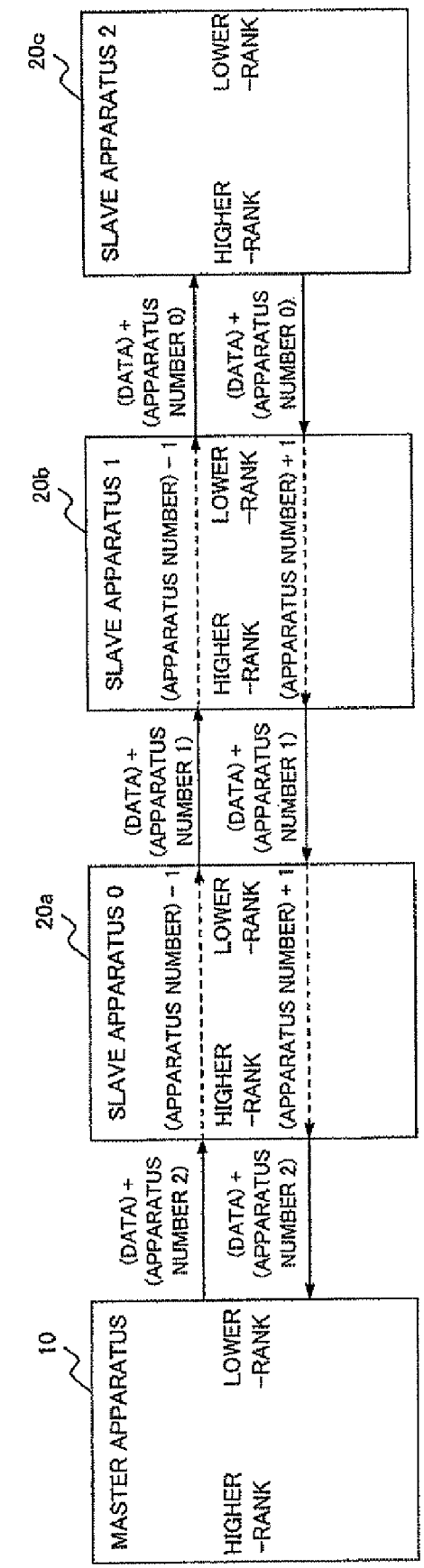
FIG. 2 is a diagram for illustrating an example of operation of the data transmission system according to the first embodiment of this invention.

In concrete, as illustrated in FIG. 2, for example, when the transmitter 12 in the master apparatus 10 adds an apparatus number "2" to data and transmits the data, the transmission/reception controller 23 in the slave apparatus 20a judges that the data received by the receiver 22 is not destined for its own apparatus because the apparatus number is not "0" that is the identification number.

Incidentally, the apparatus number "2" represents the slave apparatus 20c. In an example illustrated in FIG. 2, the master apparatus 10 transmits data to the slave apparatus 20c. In FIG. 2 and FIGS. 3 and 4, the constitutional elements in the master apparatus 10 and the slave apparatuses 20a to 20c are omitted for the sake of simplicity of the drawings.

Then, the transmitter 24 in the slave apparatus 20a attaches an apparatus number "1" obtained by subtracting "1" from the apparatus number "2" to the data, and transmits the data to the slave apparatus 20b.

The transmission/reception controller 23 in the slave apparatus 20b judges that the data received by the receiver 22 is not destined for its own apparatus because the apparatus number attached to the data received by the receiver 22 is "1" that is neither equal to "0" and nor identical with the identification number.

Therefore, the transmitter 24 in the slave apparatus 20b adds an apparatus number "0" obtained by subtracting "1" from the apparatus number "1" to the data, and transmits the data to the slave apparatus 20c.

The transmission/reception controller 23 in the slave apparatus 20c judges that the data is destined for its own apparatus because the apparatus number "0" added to the data received by the receiver 22 is "0" that is identical to the identification number "0". At this time, the transmission/reception controller 23 in the slave apparatus 20c causes the response transmitter 25 to transmit response data according to the received data if it is necessary to send a reply (response) to the master apparatus 10.

In this data transmission system 1a, each of the slave apparatuses 20a to 20c can transmit and receive data to and from the master apparatus 10 only by retaining a common identification number without setting its own apparatus number. As a result, it is possible to save the time required to set the apparatus number in each slave apparatus 20 as done before.

The master apparatus 10 adds an apparatus number "1" to data when transmitting the data to the slave apparatus 20b, or an apparatus number "0" to data when transmitting the data to the slave apparatus 20a, on the basis of apparatus numbers that are the slave apparatus information retained in the slave apparatus number retention section 11. Whereby, the transmission/reception controller 23 in the slave apparatus 20a or 20b can judge whether or not the data received by the receiver 22 is destined for its own apparatus.

The apparatus number of each of the slave apparatuses 20a to 20c retained by the slave apparatus number retention section 11 of the master apparatus 10 is determined on the basis of the quantity of the slave apparatuses 20a to 20c, the identification number "0" retained by the identification number retention section 21 of each of the slave apparatuses 20a to 20c and a predetermined value to be added or subtracted by the transmitter 24 of each of the slave apparatuses 20a and 20b when the data is not destined for its own apparatus.

The response transmitter 25 adds the identification number "0" serving as the apparatus number to response data to the master apparatus 10, and transmits the response data to the master apparatus 10 or a slave apparatus connected to the higher-rank side thereof, under control of the transmission/reception controller 23.

More concretely, the response transmitter 25 in the slave apparatus 20c transmits response data to the slave apparatus 20b on its higher-rank side. The response transmitter 25 in the slave apparatus 20b transmits the response data to the slave apparatus 20a on its higher-ranked side. Further, the response transmitter 25 in the slave apparatus 20a transmits the response data to the master apparatus 10.

The response receiver 26 receives response data transmitted from the response transmitter 25 in another slave apparatus 20 on its lower-rank side.

More concretely, the response receiver 26 in the slave apparatus 20b receives response data transmitted from the response transmitter 25 in the slave apparatus 20c on its lower-rank side. The response receiver 26 in the slave apparatus 20a receives response data transmitted from the response transmitter 25 in the slave apparatus 20b on its lower-rank side.

The response transmitter 26 in each of the slave apparatuses 20a and 20b is controlled by the transmission/reception controller 23. When the response receiver 26 in the slave apparatus 20a or 20b receives response data from another slave apparatus 20, the response transmitter 26 adds or subtracts a predetermined value to or from an apparatus number attached to the response data (here, adds "1") to change the apparatus number, attaches the changed apparatus number to the response data, and transmits the response data to the master apparatus 10 or another slave apparatus 20 on its higher-rank side, in a reverse way of what done by the transmitter 24 in its own apparatus 20a or 20b (that is, in a reverse process applied to the apparatus number attached to the transmission data).

In other words, as illustrated in FIG. 2, when data is transmitted from the upstream side toward the downstream side in this data transmission system 1a, the apparatus number attached to the data is subtracted "1" each time the apparatus number attached to the data is passed through a slave apparatus 20. Reversely, when response data is transmitted from the lower-rank side toward the higher-rank side in this data transmission system 1a (from the slave apparatus 20c to the master apparatus 10 in the example illustrated in FIG. 2), the apparatus number attached to the response data is added "1" each time the apparatus number attached to the response data is passed through a slave apparatus 20.

Described here is a process performed by the master apparatus 10 to recognize the quantity of slave apparatuses 20a to 20c connected to the master apparatus 10 itself in a cascade configuration and to determine an apparatus number for each of the slave apparatuses 20a to 20c at the time of initial setting of this data transmission system 1a. In other words, described here are details of the transmission/reception controller 14, the quantity recognition section 15 and the slave apparatus number determination section 16 of the master apparatus 10.

Figure 3:
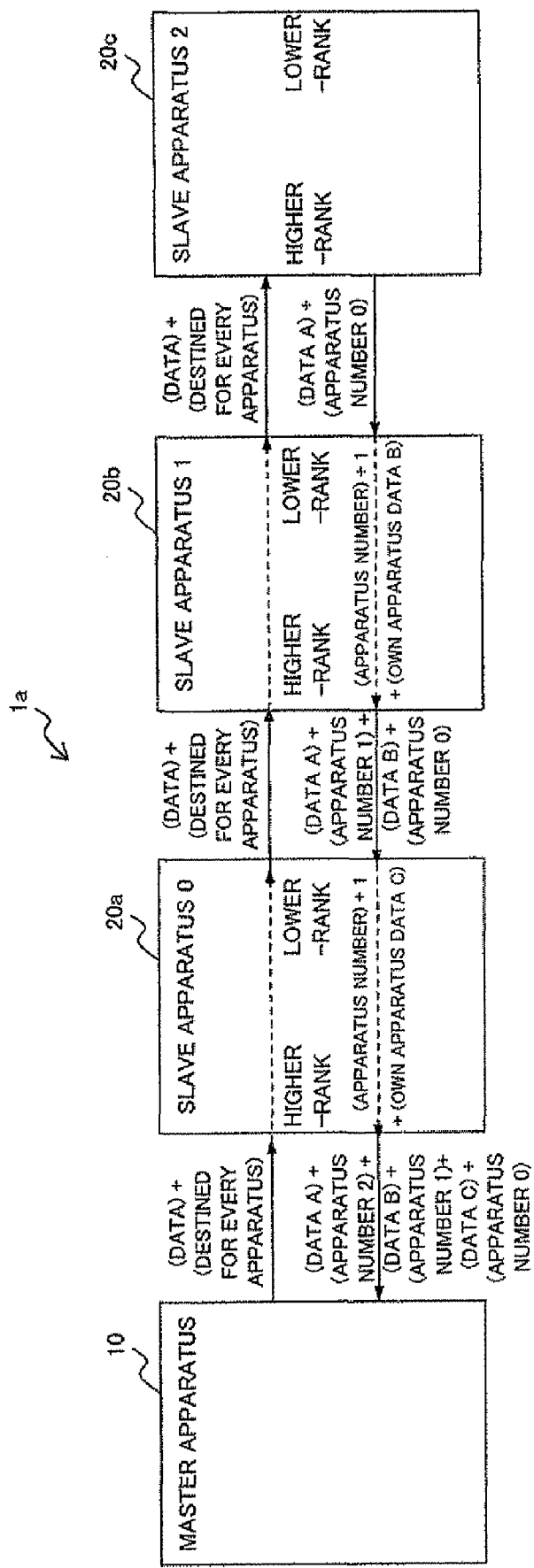
FIG. 3 is a diagram for illustrating a transmission/reception controller, a quantity recognition section and a slave apparatus number determination section of the data transmission system according to the first embodiment of this invention.
Figure 4:
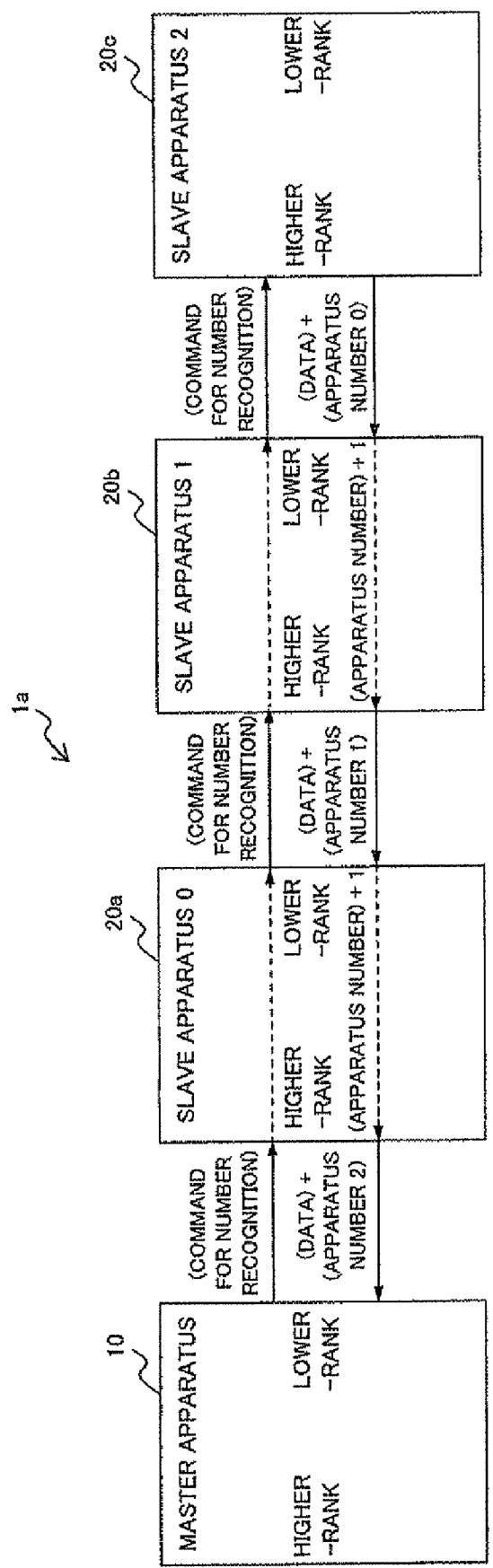
FIG. 4 is a diagram for illustrating the transmission/reception controller, the quantity recognition section and the slave apparatus number determination section of the master apparatus of the data transmission system according to the first embodiment of this invention.

The master apparatus 10 recognizes the quantity of the slave apparatuses 20a to 20c in a first method illustrated in FIG. 3 or in a second method illustrated in FIG. 4, and determines an apparatus number for each of the slave apparatuses 20a to 20c.

According to the first method illustrated in FIG. 3, the transmitter 12 in the master apparatus 10 is controlled by the transmission/reception controller 14 to transmit data for quantity recognition destined for each of all the plural slave apparatuses 20a to 20c connected to the master apparatus 10 in a cascade configuration.

In other words, the transmission/reception controller 14 functions as a transmission controller which causes the transmitter 12 to transmit data for quantity recognition destined for each of all the slave apparatuses 20a to 20c.

The data for quantity recognition transmitted from the transmitter 12 in the master apparatus 10 is finally received by the receiver 22 of the slave apparatus 20c via the receiver 22 and the transmitter 24 of the slave apparatus 20a, and the receiver 22 and the transmitter 24 of the slave apparatus 20b in order.

At this time, the transmitter 24 does not perform the process of subtracting "1" from the apparatus number because the data for quantity recognition is destined for all the apparatuses 20a to 20c.

The data for quantity recognition transmitted from the transmitter 12 of the master apparatus 10 is used to transmit the response data from the slave apparatuses 20a to 20c having received the data for quantity recognition. Namely, when the receiver 22 receives the data for quantity recognition, the transmission/reception controller 23 causes the response transmitter 25 to transmit the response data.

Since the data for quantity recognition is destined for each of all the slave apparatuses 20a to 20c, when the transmission/reception controller 23 in each of the slave apparatuses 20a and 20b recognizes that the received data is the data destined for all the apparatuses 20a to 20c for quantity recognition, the transmission/reception controller 23 does not cause the response transmitter 25 to transmit the response data to the master apparatus 10 until receiving response data from another slave apparatuses 20b and 20c in the rank lower than its own apparatus.

On the other hand, the slave apparatus 20c recognizes that no apparatus is connected to, for example, its connection section (for example, a connection terminal or an interface) on its lower-rank side, so as to recognize that no slave apparatus lower in rank than itself is connected on the lower-rank side thereof, that is, itself is the lowest-ranked apparatus. If recognizing that the slave apparatus 20c itself is the lowest-ranked apparatus, the transmission/reception controller 23 of the slave apparatus 20c controls the transmitter 24 to transmit the response data to the master apparatus 10 when the receiver 22 receives the data for quantity recognition.

The response transmitter 25 of the lowest-ranked slave apparatus 20c adds its own identification number "0" the apparatus number to response data (denoted as "data A" in the drawing; hereinafter referred to as response data A) and transmits the response data A toward the master apparatus 10. The response data A is received by the receiver 13 of the master apparatus 10 via the response receiver 26 and the response transmitter 25 of the slave apparatus 20b, and the response receiver 26 and the response transmitter 25 of the slave apparatus 20a in order.

At this time, the response transmitter 25 of the slave apparatus 20b adds "1" to the apparatus number attached to the received response data A and transmits the response data A to the higher-ranked slave apparatus 20a under control of the transmission/reception control section 23.

In addition, the response transmitter 25 of the slave apparatus 20b adds the identification number "0" to its own response data (denoted as "data B" in the drawing; hereinafter referred to as response data B) as the apparatus number, and transmits the response data B to the higher-ranked slave apparatus 20a.

Under control of the transmission/reception control section 23, the response transmitter 25 of the slave apparatus 20a adds "1" to the apparatus number attached to the received response data A, and transmits the resultant apparatus number together with the response data A to the higher-ranked master apparatus 10, at the same time, adds "1" to the apparatus number attached to the response data B and transmits the resultant apparatus number together with the response data B to the master apparatus 10.

In addition, the response transmitter 25 of the slave apparatus 20a adds the identification number "0" to its own response data as the apparatus number (denoted as "data C" in the drawing; hereinafter, referred to as response data C), and transmits them to the higher-ranked master apparatus 10.

When the receiver 13 of the master apparatus 10 receives the apparatus numbers of the respective response data A, B and C, the quantity recognition section 15 recognizes that the quantity of the slave apparatuses 20a to 20c is "3" on the basis of the apparatus number "2" added to the response data A transmitted from the lowest-ranked slave apparatus 20c, that is, on the basis of the maximum value of the apparatus number.

In other words, the quantity recognition section 15 recognizes the quantity of the plural slave apparatuses 20a to 20c on the basis of the apparatus number added to the response data A from the lowest-ranked slave apparatus 20c received by the receiver 13.

More concretely, since the identification number of all the slave apparatuses 20a to 20c is "0" and the number of the slave apparatuses 20a and 20b that have repeated the apparatus number is added to the identification number (that is, each of the slave apparatuses 20a and 20b adds "1" to the apparatus number), the quantity recognition section 15 recognizes, on the basis of the apparatus number "2", that "3" obtained by adding "1" to the apparatus number "2" is the quantity of the slave apparatuses 20a to 20c.

Then, the slave apparatus number determination section 16 determines an apparatus number for each of the plural slave apparatuses 20a to 20c on the basis of the quantity "3" of the plural slave apparatuses 20a to 20c recognized by the quantity recognition section 15.

Concretely, the slave apparatus number determination section 16 determines an apparatus number for each of the slave apparatuses 20a to 20c according to the quantity of the plural slave apparatuses 20a to 20c, the identification number "0" retained by the identification number retention section 21 and the predetermined number "1" to be subtracted or added from or to the apparatus number by the transmitter 24 in each of the slave apparatuses 20a to 20c.

The slave apparatus number determination section 16 determines the same number as the identification number to be the apparatus number of the slave apparatus 20a directly connected to the master apparatus 10, and determines the number obtained by adding the predetermined value "1" to the apparatus number of the slave apparatus 20a to be the apparatus number of the slave apparatus 20b in the lower rank, and so on.

The slave apparatus number retention section 11 retains apparatus numbers of the plural slave apparatuses 20a to 20c determined by the slave apparatus number determination section 16.

Next, a second method illustrated in FIG. 4 is explained. Under control of the transmission/reception controller 14, the transmitter 12 of the master apparatus 10 transmits a command for quantity recognition that requests the lowest-ranked slave apparatus (here, the slave apparatus 20c) among the slave apparatuses 20a to 20c connected to the master apparatus 10 to send back response data.

Namely, the transmission/reception controller 14 functions as a transmission controller which causes the transmitter 12 to transmit a command for quantity recognition that requests the lowest-ranked slave apparatus 20c to send back response data.

The slave apparatus 20a, 20b or 20c having received the command for quantity recognition transmits response data to the master apparatus 10 only when the slave apparatus 20a, 20b or 20c recognizes that itself is the lowest-ranked apparatus. In other words, the command for quantity recognition is a command requesting only one transmission/reception controller 23 recognizing that its own apparatus is the lowest-ranked apparatus to send back response data from its response transmitter 25.

As stated above, the transmission/reception controller 23 of the slave apparatus 20c recognizes that its own apparatus is the lowest-ranked apparatus by recognizing that no apparatus is connected to the lower-rank side thereof.

The command for quantity recognition transmitted from the transmitter 12 of the master apparatus 10 is received by the receiver 22 of the slave apparatus 20c via the receiver 22 and the transmitter 24 of the slave apparatus 20a, and the receiver 22 and the transmitter 24 of the slave apparatus 20b in order.

When the receiver 22 of the slave apparatus 20c receives the command for quantity recognition, the transmission/reception controller 23 of the same causes the response transmitter 25 to add its own identification number "0" as the apparatus number to the response data, and transmit response data to the higher-ranked apparatus.

The apparatus number accompanying the response data transmitted from the response transmitter 25 of the slave apparatus 20c is added "1" thereto in the response transmitter 25 of each of the slave apparatuses 20b and 20a, and finally received by the receiver 13 of the master apparatus 10, as illustrated in FIG. 4.

When the receiver 13 of the master apparatus 10 receives the response data and the apparatus number, the quantity recognition section 15 recognizes that the quantity of all the slave apparatuses 20a to 20c is "3" on the basis of the apparatus number "2" attached to the response data from the lowest-ranked slave apparatus 20c, in the same manner as the above-mentioned first method.

The slave apparatus number determination section 16 determines apparatus numbers for the plural slave apparatuses 20a to 20c on the basis of the quantity "3" of the plural slave apparatuses 20a to 20c recognized by the quantity recognition section 15, in the same manner as the above-mentioned first method.

The slave apparatus number retention section 11 retains apparatus numbers of the plural slave apparatuses 20a to 20c determined by the slave apparatus number determination section 16.

According to the data transmission system 1a (data transmission method as the first embodiment of this invention) according to the first embodiment of this invention, the master apparatus 10 has the slave apparatus number retention section 11 which retains apparatus numbers of a plurality of slave apparatuses 20a to 20c, and transmitter 12 which adds an apparatus number of one slave apparatus that is a destination of data, and transmits the resultant data to a lower-ranked slave apparatus 20a. Each of the slave apparatuses 20a to 20c has the identification number retention section 21 which retains the same identification number, the receiver 22 which receives data from a higher-ranked apparatus, the judgment section (transmission/reception controller 23) which judges that when the apparatus number attached to data received by the receiver 22 coincides with the identification number, the data is destined for itself, while judging that when the apparatus number does not coincide with the identification number, the data is destined for another slave apparatus 20a, 20b or 20c, and the transmitter 24 which, when the judgment section judges that the data is destined for another slave apparatus 20a, 20b or 20c, subtracts a predetermined value "1" from the apparatus number to change the apparatus number, adds the changed apparatus number to the data, and transmits the data to another lower-ranked slave apparatus 20a, 20b or 20c. Accordingly, even if each of the plural slave apparatuses 20a to 20c does not automatically set its own apparatus number differently from the known techniques, the master apparatus 10 can transmit data to each of the slave apparatuses 20a to 20c. As a result, it is possible to save the time required for the automatic setting, which contributes to speed-up of the data transmission processing. Since what each of the slave apparatus 20a to 20c is required is only to retain a pre-set default value in its identification number retention section 21, it is unnecessary for each of the slave apparatuses 20a to 20c to set its own apparatus number or apparatus numbers of the other slave apparatuses according to the number or the like of the higher-ranked and lower-ranked slave apparatuses 20a to 20c in this data transmission system 1a.

Since such the automatic setting is dispensable, signal connections and circuits among the apparatuses 10 and 20a to 20c for the automatic setting are dispensable, which contributes to a reduction in resource and cost, and improves the versatility of the slave apparatuses 20a to 20c.

Furthermore, since the identification numbers beforehand retained in the identification number retention sections 11 of the slave apparatuses 20a to 20c are the same, it is possible to employ the default value intact, thus the identification number can be set very easily.

Each of the slave apparatuses 20a to 20c has the response transmitter 25 which adds the identification number to response data to the master apparatus 10 as the apparatus number and transmits the response data together with the apparatus number to the master apparatus 10 or another slave apparatus 20a or 20b connected to the higher-rank side thereof, and the response receiver 26 which receives the response data transmitted from the response transmitter 25 of another lower-ranked slave apparatus 20b or 20c. When the response receiver 26 receives response data from another slave apparatus 20b or 20c, the response transmitter 25 adds a predetermined value "1" to the apparatus number attached to the response data, which is the reversal of subtraction performed by the transmitter 24 in its own slave apparatus 24, attaches the apparatus number to the response data, and transmits the response data to the master apparatus 10 or another slave apparatus 20a connected to the higher-rank side thereof. Accordingly, it is possible to transmit data (reply) to the master apparatus 10 from the slave apparatuses 20a to 20c without necessity of automatically setting an apparatus number by each of the plural slave apparatuses 20a to 20c. As a result, the time required for the automatic setting can be saved, which contributes to speed-up of the data transmission processing.

The master apparatus 10 has the transmission controller 14 which causes the transmitter 12 to transmit data for quantity recognition destined for all the plural slave apparatuses 20a to 20c in order to recognize the quantity of the plural slave apparatuses 20a to 20c, the receiver 13 which receives response data from the response transmitter 25 of the lowest-ranked slave apparatus 20c via the other slave apparatuses 20a and 20b, the quantity recognition section 15 which recognizes the quantity of the plural slave apparatuses 20a to 20c on the basis of the apparatus number attached to the response data received by the receiver 13, and the slave apparatus number determination section 16 which determines an apparatus number for each of the plural slave apparatuses 20a to 20c on the basis of the quantity of the plural slave apparatuses 20a to 20c recognized by the quantity recognition section 15. The slave apparatus number retention section 11 retains the apparatus numbers determined by the slave apparatus number determination section 16. Accordingly, the master apparatus 10 can determine an apparatus number of each of the plural slave apparatuses 20a to 20c with certainty without automatically setting an apparatus number of each of the plural slave apparatuses 20a to 20c.

The master apparatus 10 has the transmission controller 14 which causes the transmitter 12 to transmit a command for quantity recognition requesting the response transmitter 25 of the lowest-ranked slave apparatus 20c among the plural slave apparatuses 20a to 20c to transmit response data in order to recognize the quantity of the plural slave apparatuses 20a to 20c, the receiver 13 which receives the response data from the response transmitter 25 of the lowest-ranked slave apparatus 20c via the other slave apparatuses 20a and 20b, the quantity recognition section 15 which recognizes the quantity of the plural slave apparatuses 20a to 20c on the basis of the apparatus number attached to the response data received by the receiver 13, and the slave apparatus number determination section 16 which determines an apparatus number of each of the plural slave apparatuses 20a to 20c on the basis of the quantity of the plural slave apparatuses 20a to 20c recognized by the quantity recognition section 15. The slave apparatus number retention section 11 retains apparatus numbers determined by the slave apparatus number determination section 16. Accordingly, the master apparatus 10 can determine apparatus numbers of the plural slave apparatuses 20a to 20c, with certainty, without automatically setting apparatus numbers for the plural slave apparatuses 20a to 20c. Whereby, it becomes possible to certainly carry out data transmission/reception among the master apparatus 10 and the slave apparatuses 20a to 20c.

The slave apparatus number determination section 16 of the master apparatus 10 determines an apparatus number for each of the plural slave apparatuses 20a to 20c according to the quantity of the plural slave apparatuses 20a to 20c, the identification number retained in the identification number retention section 21, and a predetermined value "1" to be subtracted from the apparatus number of data when the transmitter 24 of each of the slave apparatuses 20a to 20c passes the data to the lower-ranked apparatus. As this, the slave apparatus number determination section 16 can accurately determine apparatus numbers according to the operations of the slave apparatuses 20a to 20c.

[2] Second Embodiment

Next, description will be made of a data transmission system (hereinafter, referred to as this data transmission system) 1b according to a second embodiment.

Figure 5:
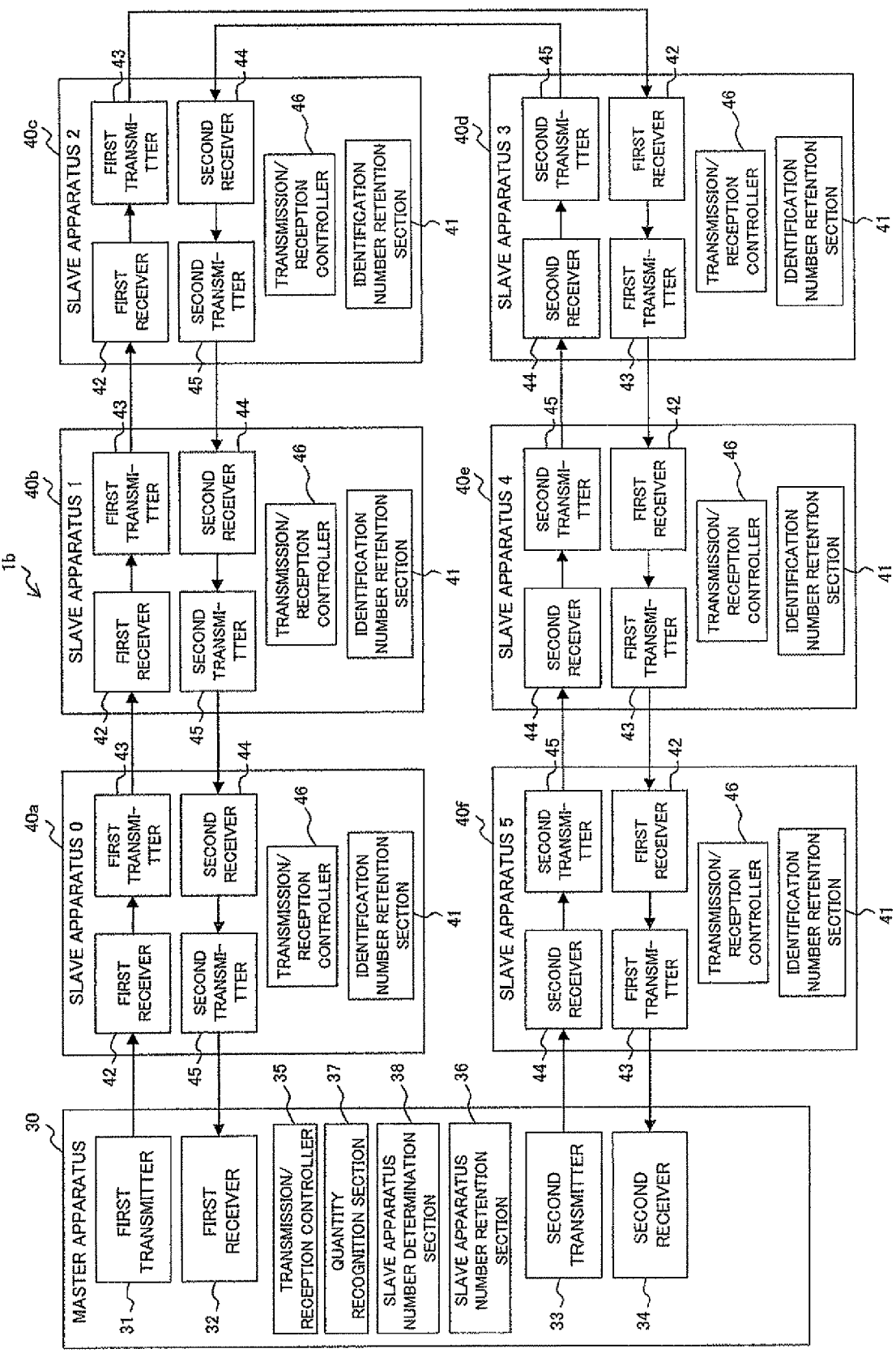
FIG. 5 is a block diagram illustrating functional configuration of a data transmission system according to a second embodiment of this invention.

FIG. 5 is a block diagram illustrating functional configuration of this data transmission system 1b. As illustrated in FIG. 5, this data transmission system 1b is configured by connecting a master apparatus 30, and a plurality of slave apparatuses 40a to 40f (denoted as "slave apparatus 0", "slave apparatus 1", "slave apparatus 2", "slave apparatus 3", "slave apparatus 4" and "slave apparatus 5" in the drawing) are connected to one another in a ring configuration.

The master apparatus 30 is connected to two slave apparatuses 40a and 40f so as to be able to transmit and receive data to and from these slave apparatuses 40a and 40f.

The master apparatus 30 has a first transmitter 31 which transmits data to the slave apparatus 40a and a first receiver 32 which receives data from the slave apparatus 40a.

Further, the master apparatus 30 has a second transmitter 33 which transmits data to the slave apparatus 40f and a second receiver 34 which receives data from the slave apparatus 40f.

A transmission/reception controller 35 controls data transmission/reception by the first transmitter 31, the first receiver 32, the second transmitter 33 and the second receiver 34.

In concrete, when transmitting transmission data to one of the plural slave apparatuses 40a to 40f, the transmission/reception controller 35 causes the first transmitter 31 or the second transmitter 33 to add command information (identification bit) representing that the transmission data is data from the master apparatus 30 and an apparatus number of a destination slave apparatus 40a, 40b, . . . or 40f to the transmission data, and transmit the transmission data.

Namely, the first transmitter 31 or the second transmitter 33 as being a transmission section transmits transmission data, to which command information representing that the transmission data is from the master apparatus 30 and an apparatus number specifying one of the slave apparatuses 40a to 40f are added, to the slave apparatus 40a or the slave apparatus 40f in order to transmit the transmission data to one of the plural slave apparatuses 40a to 40f.

Note that which one of the first transmitter 31 and the second transmitter 33 transmits the transmission data is not limited in the second embodiment. However, it is preferable that either one of the first transmitter 31 and the second transmitter 33 that is positioned closer to the destination slave apparatus 40a, 40b, . . . or 40f is used for the transmission.

Accordingly, when the master apparatus 30 transmits transmission data to the slave apparatus 40a, 40b or 40c in this data transmission system 1b, it is preferable that the first transmitter 31 transmit the transmission data. When the master apparatus 30 transmits transmission data to the slave apparatuses 40d, 40e or 40f, it is preferable that the second transmitter 33 transmit the transmission data.

A slave apparatus number retention section 36 retains apparatus numbers that are address numbers of the respective plural slave apparatuses 40a to 40f in this data transmission system 1b.

The apparatus numbers retained by the slave apparatus number retention section 36 are determined by a slave apparatus number determination section 38. As the apparatus numbers of the slave apparatuses 40a to 40f retained by the slave apparatus number retention section 36, the slave apparatus 40a is set to "0", the slave apparatus 40b "1", the slave apparatus 40c "2", the slave apparatus 40d "3", the slave apparatus 40e "4" and the slave apparatus 40f "5".

Details of the above-mentioned transmission/reception controller 35, a quantity recognition section 37 and the slave apparatus number determination section 38 will be described later with reference to FIG. 7.

The slave apparatuses 40a to 40f all have the same configuration. Accordingly, when the slave apparatuses 40a to 40f are not discriminated from one another, the slave apparatus will be referred to as slave apparatus 40 in the following description.

The slave apparatus 40 has an identification number retention section 41, a first receiver 42, a first transmitter 43, a second receiver 44, a second transmitter 45 and a transmission/reception controller 46.

The identification number retention section 41 retains the same identification number, here "0", as the other slave apparatuses 40a to 40f. In other words, the slave apparatuses 40 retain the same identification number in their identification number retention sections 41. This identification number is a default value, thus the identification number retention section 41 does not need to have a function of changing the retained identification number.

The first receiver 42 and the second receiver 44 as being a reception section each receive data transmitting from the adjacent apparatus (the master apparatus 30 or another slave apparatus 40).

Namely, the first receiver 42 receives data transmitted from an apparatus connected to one side of its own slave apparatus 40. On the other hand, the second receiver 44 receives data transmitted from an apparatus connected to the other side of its own slave apparatus 40.

The first transmitter 43 and the second transmitter 45 as being a transmission section each transmits data transmitted from the adjacent apparatus.

The first transmitter 43 corresponds to the first receiver 42, which transmits data to an apparatus connected to one side of its own slave apparatus 40. On the other hand, the second transmitter 45 corresponds to the second receiver 44, which transmits data to an apparatus connected to the other side of its own slave apparatus 40.

The first receiver 42 of the slave apparatus 40a receives data transmitted from the first transmitter 31 of the master apparatus 30. The second transmitter 45 of the slave apparatus 40a transmits data to the first receiver 32 of the master apparatus 30.

Further, the second receiver 44 of the slave apparatus 40f receives data transmitted from the second transmitter 33 of the master apparatus 30. The first transmitter 43 of the slave apparatus 40f transmits data to the second receiver 34 of the master apparatus 30.

Namely, this data transmission system 1b has a ring-like first transmission line formed of the first transmitter 31 of the master apparatus 30, the first receivers 42 and the first transmitters 43 of the plural slave apparatuses 40a to 40f and the second receiver 34 of the master apparatus 30, and a ring-like second transmission line formed of the second transmitter 33 of the master apparatus 30, the second receivers 44 and the second transmitters 45 of the plural slave apparatuses 40f to 40a and the first receiver 32 of the master apparatus 30.

The transmission/reception controller 46 controls data transmission/reception by the first receiver 42, the first transmitter 43, the second receiver 44 and the second transmitter 45.

When command information is attached to data received by the first receiver 42 or the second receiver 44, the transmission/reception controller 46 recognizes that this data is transmission data from the master apparatus 30.

In this case, the transmission/reception controller 46 functions as a judgment section which judges whether this transmission data is transmitted from the master apparatus 30 and destined for its own apparatus accordingly whether an apparatus number attached to this data is the identification number "0" retained in the identification number retention section 41.

Namely, when the apparatus number of the transmission data received by the first receiver 42 or the second receiver 44 is the identification number, that is, when these numbers agree with each other, the transmission/reception apparatus 46 as being the judgment section judges that this data is destined for its own apparatus.

On the other hand, when the apparatus number attached to the transmission data received by the first receiver 42 or the second receiver 44 is not the identification number, that is, when these numbers do not agree with each other, the transmission/reception controller 46 judges that this data is destined for not its own apparatus but another slave apparatus 40.

When judging that this transmission data is transmitted not to its own apparatus but to another slave apparatus 40, the transmission/reception controller 46 controls the first transmitter 43 corresponding to the first receiver 42 or the second transmitter 43 corresponding to the second receiver 45 having received this transmission data to subtract or add a predetermined value from or to the apparatus number (here, subtracting "1") to change the apparatus number, attach the changed apparatus number to the data, and transmit the data to a slave apparatus on the opposite side of the slave apparatus from which this transmission data has been transmitted.

Namely, when the transmission/reception controller 46 as being the judgment section judges that data received by the first receiver 42 or the second receiver 44 is not destined for its own apparatus, the first transmitter 43 or the second transmitter 45 as being the transmission section changes the apparatus number attached to the transmission data by subtracting or adding a predetermined value (here, subtracting "1") from or to the apparatus number, adds the changed apparatus number to the transmission data, and transmits the transmission data to another slave apparatus 40.

Figure 6:
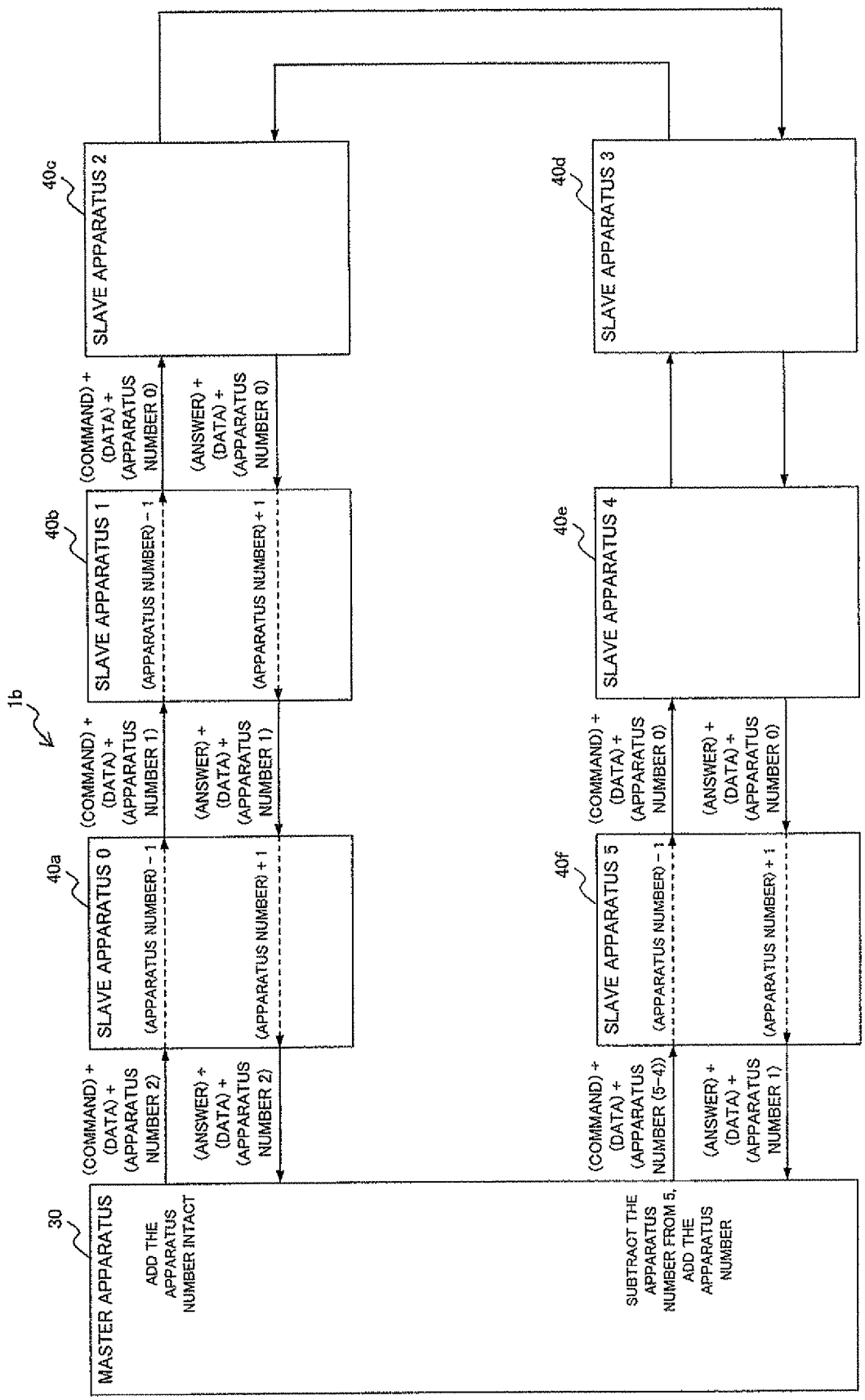
FIG. 6 is a diagram for illustrating an example of operation of the data transmission system according to the second embodiment.

In concrete, as illustrated in FIG. 6, for example, when the first transmitter 31 of the master apparatus 30 adds command information (denoted as "command" in the drawing) and an apparatus number "2" to data and transmits them, the transmission/reception controller 46 of the slave apparatus 40a judges that the transmission data received by the first receiver 42 is not destined for its own apparatus because the apparatus number is not identical to the identification number "0".

Incidentally, an apparatus number "2" represents the slave apparatus 40c. The example in FIG. 6 shows a case where the first transmitter 31 of the master apparatus 30 transmits data to the slave apparatus 40c and a case where the second transmitter 33 of the master apparatus 30 transmits data to the slave apparatus 40e. In FIGS. 6 and 7 to be described later, constitutional elements of the master apparatus 30 and the slave apparatuses 40a to 40f are omitted for the sake of simplicity of the drawings.

Next, the first transmitter 43 of the slave apparatus 40a attaches an apparatus number "1" obtained by subtracting "1" from the apparatus number "2" to the data, and transmits the data to the slave apparatus 40b.

The transmission/reception controller 46 of the slave apparatus 40b judges that the data received by the first receiver 42 is not destined for its own apparatus, as well, because the apparatus number "1" attached to the transmission data received by the first receiver 42 is not identical to the identification number "0".

The first transmitter 43 of the slave apparatus 40b attaches an apparatus number "0" obtained by subtracting "1" from the apparatus number "1" to the transmission data, and transmits the transmission data to the slave apparatus 40c.

The transmission/reception controller 46 of the slave apparatus 40c judges that the transmission data is destined for its own apparatus because the apparatus number "0" attached to the data received by the first receiver 42 coincides with the identification number "0". At this time, the transmission/reception controller 46 of the slave apparatus 40c causes the second transmitter 45 to send back response data according to the received data if required to send back a response to the master apparatus 30.

As above, in this data transmission system 1b, the slave apparatuses 40a to 40f can transmit and receive data to and from the master apparatus 30 only by retaining a common identification number without setting respective apparatus numbers. As a result, it becomes possible to save the time required to set the apparatus numbers, differently from the known techniques.

Next, description will be made of an example where the second transmitter 33 of the master apparatus 30 transmits transmission data to the slave apparatus 40e.

In this case, the second transmitter 33 of the master apparatus 30 attaches an apparatus number for specifying the slave apparatus 40e together with command information (denoted as "command" in the drawing) to transmission data to be outputted to the slave apparatus 40f.

Unlike an apparatus number attached by the first transmitter 31, an apparatus number to be attached by the second transmitter 33 is not an apparatus number retained in the slave apparatus number retention section 36. But, the second transmitter 33 attaches an apparatus number (here, "1") obtained by subtracting an apparatus number (here, "4") of a destination slave apparatus 40 from the maximum value (here, "5") of the apparatus numbers to the data.

Namely, when causing the first transmitter 31 to transmit transmission data, the transmission/reception controller 35 attaches an apparatus number intact retained in the slave apparatus number retention section 36 as the apparatus number to the transmission data. On the other hand, when causing the second transmitter 33 to transmit data, the transmission/reception controller 35 attaches a value obtained by subtracting an apparatus number of the destination slave apparatus 40 retained in the slave apparatus number retention section 36 from the maximum value of the apparatus numbers retained in the slave apparatus number retention section 36 as the apparatus number to the transmission data to the transmission data, not attaching the apparatus number intact retained in the slave apparatus number retention section 36 to the transmission data.

In this case, under control of the transmission/reception controller 35, the second transmitter 33 attaches a value "1" obtained by subtracting an apparatus number "4" of the slave apparatus 40e retained in the slave apparatus number retention section 36 from the maximum value "5" as the apparatus number to the transmission data.

When the second receiver 44 of the slave apparatus 40f receives this transmission data, the transmission/reception controller 46 of the slave apparatus 40f judges that the transmission data received by the second receiver 44 is destined not for its own apparatus but for another slave apparatus 40 because the apparatus number "1" does not coincide with the identification number "0".

The second transmitter 45 of the slave apparatus 40f attaches an apparatus number "0" obtained by subtracting "1" from the apparatus number "1" to the data, and transmits the data to the slave apparatus 40e.

The transmission/reception controller 46 of the slave apparatus 40e judges that the transmission data is destined for its own apparatus because the apparatus number attached to the data received by the second receiver 44 is "0" that coincides with the identification number "0".

As above, in this data transmission system 1b, the master apparatus 30 can carry out data transmission from not only the first transmitter 31 but also the second transmitter 33.

Under control of the transmission/reception controller 46, the first transmitter 43 or the second transmitter 45 of the slave apparatus 40 transmits response data to the master apparatus 30.

At this time, the first transmitter 43 or the second transmitter 45 attaches answer information (identification bit) representing that this response data is a response to the master apparatus 30 and the identification number as the apparatus number to the response data, and transmits the response data to an adjacent apparatus connected to its own apparatus.

The transmission/reception controller 46 of the slave apparatus 40 recognizes that the data is response data to the master apparatus 30 when the answer information is attached to the data received by the first receiver 42 or the second receiver 44, causes the corresponding first transmitter 43 or second transmitter 45 to add "1" to the apparatus number attached to the response data to change the apparatus number, attach the changed apparatus number to the response data, and transmit the response data.

Namely, when the transmission/reception controller 46 recognizes that data received by the first receiver 42 or the second receiver 44 is response data, the first transmitter 43 or the second transmitter 45 as being the transmission section adds a predetermined value "1" to an apparatus number attached to the response data, which is the reversal of the process applied to the apparatus number attached to the transmission data, attaches the changed apparatus number to the response data, and transmits the response data to an adjacent apparatus connected to its own apparatus.

For example, when the second transmitter 44 of the slave apparatus 40c transmits response data to the master apparatus 30, as illustrated in FIG. 6, answer information (denoted as "answer" in the drawing) and an apparatus number "0" are attached to the response data.

Then, "1" is added to the apparatus number by the second transmitter 45 in each of the slave apparatus 40b and the slave apparatus 40a in order, and, the response data accompanied by an apparatus number "2" is finally received by the first receiver 32 of the master apparatus 30.

Whereby, the transmission/response controller 35 of the master apparatus 30 can judge that the response data is transmitted from the slave apparatus 40c.

When the first transmitter 43 of the slave apparatus 40e transmits response data to the master apparatus 30, as illustrated in FIG. 6, answer information (denoted as "answer" in the drawing) and an apparatus number "0" are attached to the response data (denoted as "data" in the drawing).

Then, "1" is added to the apparatus number by the first transmitter 43 of the slave apparatus 40f, and the response data accompanied by the apparatus number "1" is received by the second receiver 34 of the master apparatus 30.

In order to judge the slave apparatus 40 that is the transmission source of the data received by the second receiver 34 by recognizing the apparatus number of the transmission source of the data with reference to the apparatus numbers retained in the slave apparatus number retention section 36, the transmission/reception controller 35 of the master apparatus 30 does not use the apparatus number attached to the received data without modification, but do use the value obtained by subtracting the apparatus number attached to the received data from the above-mentioned maximum value "5".

In the example illustrated in FIG. 6, the transmission/reception controller 35 of the master apparatus 30 recognizes a value "4" obtained by subtracting the apparatus number "1" attached to the data received by the second receiver 34 from the maximum value "5" as the apparatus number of the transmission source of the data, and judges that the data is a response from the slave apparatus 40e.

Now, description will be made of a process performed by the master apparatus 30 to recognize the quantity of the slave apparatuses 40a to 40f connected to itself and determine apparatus numbers for the slave apparatuses 40a to 40f at the time of initial setting of this data transmission system 1b, that is, details of transmission/reception controller 35, the quantity recognition section 37 and the slave apparatus number determination section 38 of the master apparatus 30, with reference to FIG. 7.

The transmission section (here, the first transmitter 31) of the master apparatus 30 is controlled by the transmission/reception controller 35 to transmit a command for quantity recognition containing numerical value data for quantity count (denoted as "quantity count" in the drawing; beginning with "0") to be passed through all the slave apparatuses 40a to 40f to one (here, the slave apparatus 40a) of two slave apparatuses 40a and 40f, in order to recognize the quantity of the plural slave apparatuses 40a to 40f.

Namely, the transmission/reception controller 35 functions as a transmission controller which causes the first transmitter 31 or the second transmitter 33 to transmit a command for quantity recognition containing a numerical value data for quantity count "0".

Then, the command for quantity recognition transmitted from the first transmitter 31 of the master apparatus 30 is passed through the first receivers 42 and the first transmitters 43 of the slave apparatuses 40a to 40f in order, and finally received by the second receiver 34 of the master apparatus 30.

When the first receiver 42 of each of the slave apparatuses 40a to 40f receives a command for quantity recognition from one adjacent slave apparatus, the first transmitter 43 adds "1" to a numerical value for quantity count contained in the command for quantity recognition, and transmits the command for quantity recognition to the other adjacent apparatus under control of the transmission/reception controller 46.

Figure 7:
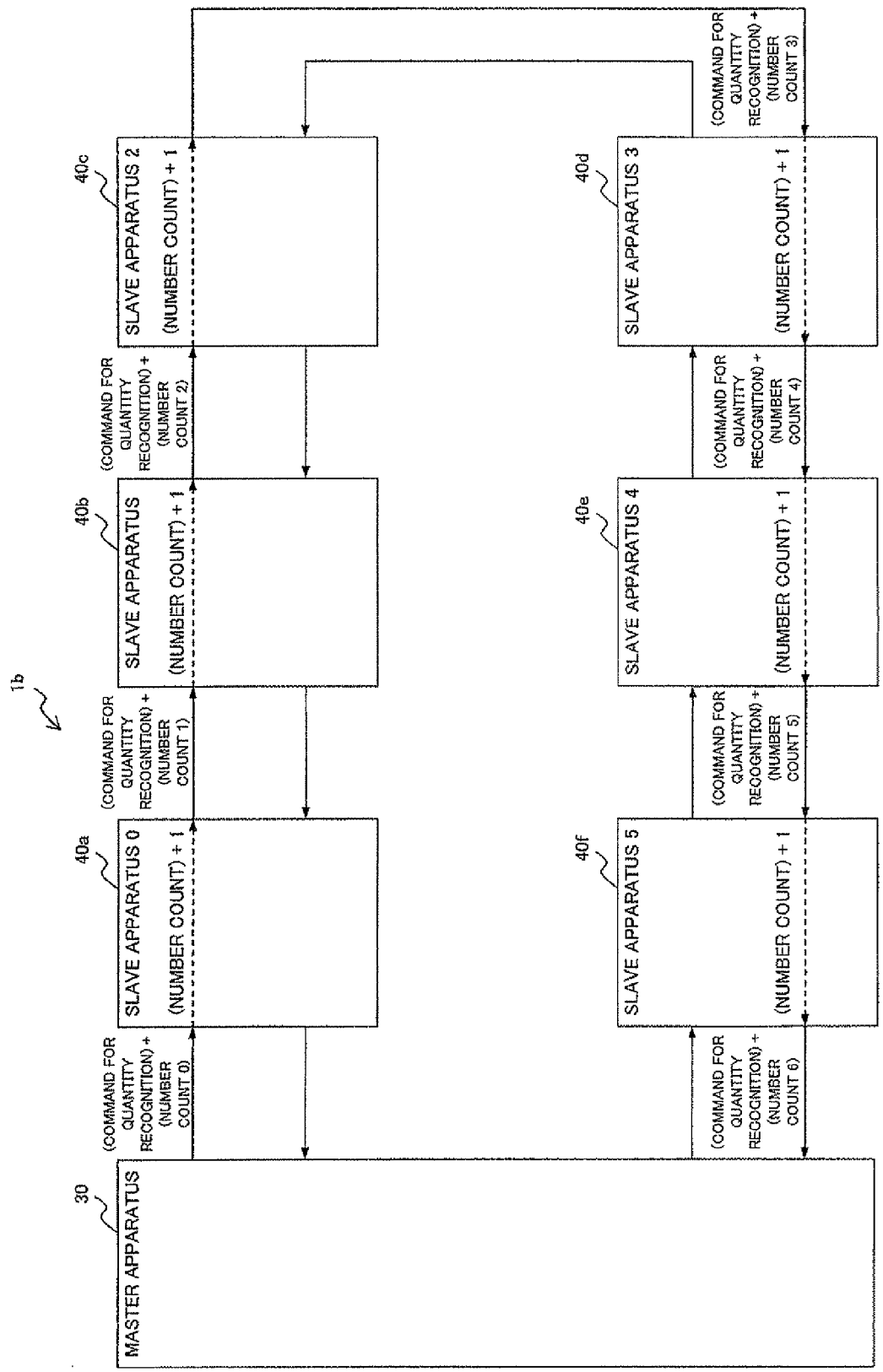
FIG. 7 is a diagram for illustrating a transmission/reception controller, a quantity recognition section and a slave apparatus number determination section of a master apparatus of the data transmission system according to the second embodiment.

In the example illustrated in FIG. 7, the second receiver 34 of the master apparatus 30 receives numerical value data for quantity count "6" together with the command for quantity recognition from the first transmitter 43 of the slave apparatus 40f.

The quantity recognition section 37 of the master apparatus 30 recognizes that numerical value data for quantity count "6"

contained in the command for quantity recognition received by the second receiver 34 is the quantity of the plural slave apparatuses 40a to 40f.

As above, the quantity recognition section 37 recognizes the quantity of the plural slave apparatuses 40a to 40f on the basis of the numerical value data for quantity count contained in the command for quantity recognition received from the other slave apparatus 40f of the two slave apparatuses 40a and 40f.

Next, the slave apparatus number determination section 38 determines apparatus numbers for the plural slave apparatuses 40a to 40f on the basis of the quantity of the plural slave apparatuses 40a to 40f recognized by the quantity recognition section 37.

In concrete, the slave apparatus number determination section 38 determines an apparatus number for each of the slave apparatuses 40a to 40f according to the quantity of the plural slave apparatuses 40a to 40f, the identification number "0", and a value "1" to be subtracted by the first transmitter 43 or the second transmitter 45 of each of the slave apparatuses 40a to 40f.

The slave apparatus number determination section 38 sets the apparatus number of the slave apparatus 40a connected to the first transmitter 31 to the same "0" as the identification number, then sets an apparatus number of each of the slave apparatuses 40b to 40f to a value obtained by adding a predetermined value "1" to the apparatus number of the preceding slave apparatus.

The slave apparatus number retention section 36 retains apparatus numbers of the plural slave apparatuses 40a to 40f determined by the slave apparatus number determining section 38.

Next, description will be made of the process performed when the transmission line among the plural slave apparatuses 40a to 40f is disconnected, with reference to FIG. 8.

When the transmission line (connection line) among the slave apparatuses 40 is disconnected for some reason, the transmission/reception controller 46 of a relevant slave apparatus 40 notifies the master apparatus 30 of an error via an apparatus or apparatuses on the opposite side of the disconnected position of the transmission line.

Figure 8:
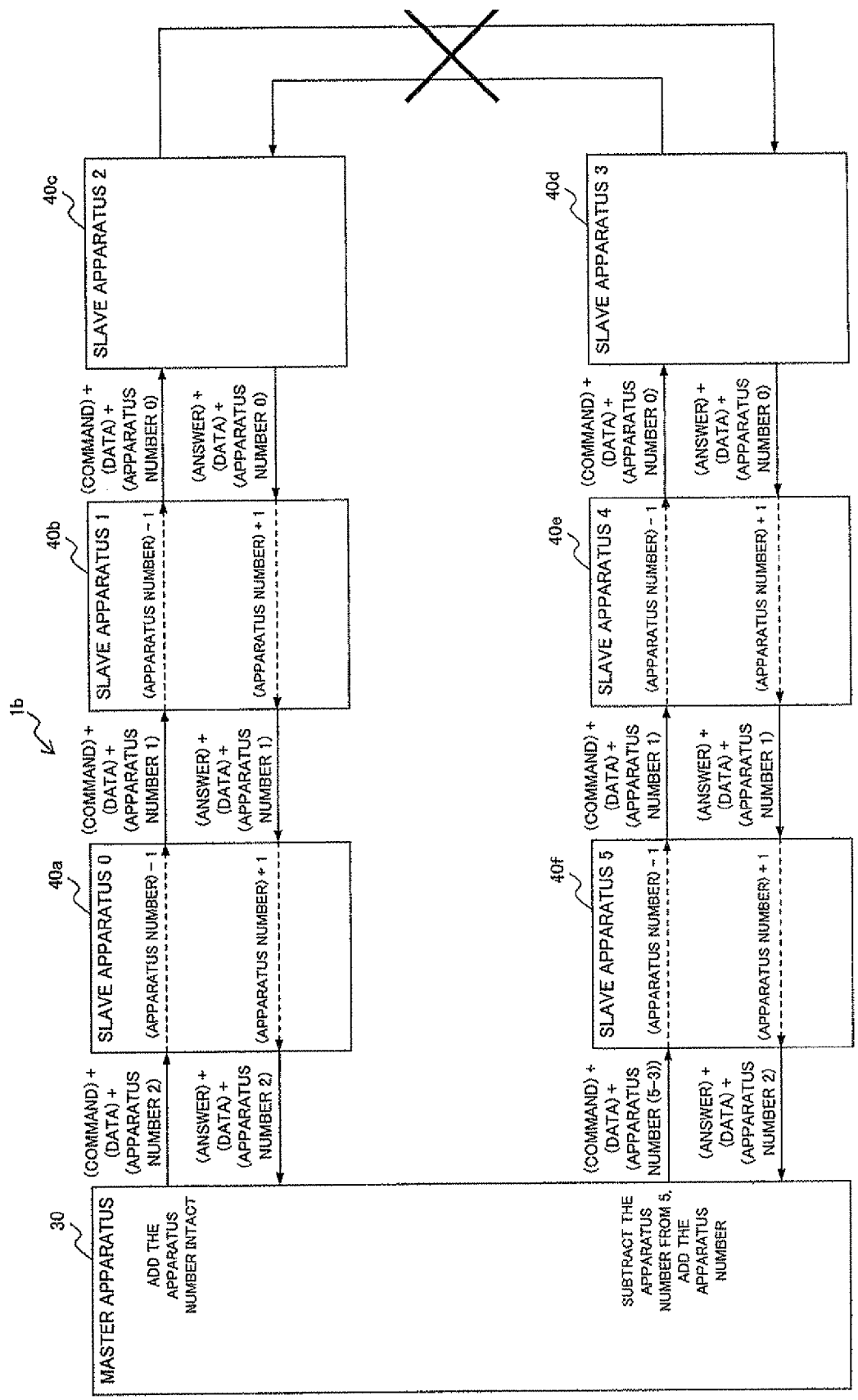
FIG. 8 is a diagram for illustrating an example of operation performed when a transmission line between slave apparatuses is disconnected in the data transmission system according to the second embodiment.

When the transmission line is disconnected between the slave apparatus 40c and the slave apparatus 40d as indicated by a cross in FIG. 8, for example, the transmission/reception controller 46 of the slave apparatus 40c uses the line on the opposite side of the disconnected position to send an error notice that the line has been disconnected to the master apparatus 30.

In concrete, the transmission/reception controller 46 causes the second transmitter 45 to transmit error information about it and the identification number.

As illustrated in FIG. 8, an error notice with the apparatus number "2" is sent to the master apparatus 30. The error notice may be accomplished by data to which answer information is attached, or by an exclusive command.

Like the slave apparatus 40c, the transmission/reception controller 46 of the slave apparatus 40d uses the line on the opposite side of the disconnected position, that is, the second transmitter 45, to send an error notice that the line has been disconnected to the master apparatus 30. At this time, an error notice with the apparatus number "2" reaches the master apparatus 30.

The transmission/reception controller 35 of the master apparatus 30 specifies the slave apparatus 40c from the apparatus number "2" attached to the error notice received by the first receiver 32, and further, specifies the slave apparatus 40d from the apparatus number "2" attached to the error notice received by the second receiver 34 in the above manner.

The transmission/reception controller 35 recognizes that the transmission line between the slave apparatus 40c and the slave apparatus 40d has been disconnected. After that, the transmission/reception controller 35 transmits data to the slave apparatuses 40a, 40b or 40c by using the first transmitter 31 and the first receiver 32, while transmitting data to the slave apparatuses 40d, 40e or 40f by using the second transmitter 33 and the second receiver 34.

As above, even if the transmission line between slave apparatuses 40 is disconnected, this data transmission system 1b can continue data transmission without affected by the disconnection.

According to the data transmission system 1b of the second embodiment (data transmission method according to the second embodiment), in the data transmission system 1b in which the master apparatus 30 and a plurality of the slave apparatuses 40a to 40f are connected in a ring configuration, the master apparatus 30 has the slave number retention section 36 which retains apparatus numbers for specifying the respective plural slave apparatuses 40a to 40f, and the transmission section (the first transmitter 31 or the second transmitter 33) which transmits command information representing that data is from the master apparatus 30 and transmission data to which an apparatus number specifying one slave apparatus 40 to either one of two slave apparatuses 40a and 40f connected to the master apparatus 30 in order to transmit the transmission data to the one slave apparatus 40 among the plural slave apparatuses 40a to 40f. Each of the plural slave apparatuses 40a to 40f has the identification number retention section 41 which retains the same identification number as the other slave apparatuses 40, the reception section (the first receiver 42 or the second receiver 44) which receives data transmitted from the master apparatus 30 or another slave apparatus 40 adjacent thereto, the judgment section (the transmission/reception controller 35) which judges that transmission data is destined for its own apparatus when command information is attached to the transmission data received by the reception section and the apparatus number attached to the transmission data coincides with the identification number, while judging that the transmission data is destined for another slave apparatus 40 when command information is attached but the apparatus number does not coincide with the identification number, and the transmission section (the first transmitter 43 or the second transmitter 45) which, when the judgment section judges that the transmission data is destined for another slave apparatus 40, subtracts "1" from the apparatus number to change the apparatus number and attaches the changed apparatus number to the transmission data, and transmits the transmission data to the following slave apparatus 40. Accordingly, it is possible to accomplish data transmission to each of the slave apparatuses 40a to 40f from the master apparatus 30 without automatically setting the apparatus number by each of the slave apparatuses 40a to 40f, differently from the above-described known techniques. As a result, the time required for the automatic setting can be saved, which contributes to speed-up of the data transmission processing.

Only by retaining the predetermined default value in the identification number retention section 41, each of the slave apparatuses 40a to 40f is immune from setting its own apparatus number and apparatus numbers of other slave apparatuses according to the number or the like of the slave apparatuses 40a to 40f positioned in the upstream or downstream in this data transmission system 1b.

Since such the automatic setting is unnecessary, circuits and signal connections among the apparatuses 30 and 40a to 40f for the automatic setting are unnecessary, which contributes to a reduction in resource and cost and improves the versatility of the slave apparatuses 40.

Since the identification numbers beforehand retained in the identification number retention sections 41 of the slave apparatuses 40a to 40f are all identical, a default value can be employed intact, which enables ready setting of the identification number.

When transmitting response data to the master apparatus 30, the transmission section of each of the plural slave apparatuses 40a to 40f adds answer information representing that the response data is a response to the master apparatus 30 and an identification number "0" as the apparatus number to the response data, and transmits the response data to the master apparatus 30 or another slave apparatus 40. When answer information is attached to data received by the reception section, the transmission section recognizes that the data is response data to the master apparatus 30, adds a predetermined value "1" to the apparatus number attached to the response data to change the apparatus number, attaches the changed apparatus number to the response data, and transmits the response data to the master apparatus 30 or another slave apparatus 40 adjacent thereto. Accordingly, data transmission (response) to the master apparatus 30 from each of the slave apparatuses 40a to 40f can be accomplished even if each of the slave apparatuses 40a to 40f does not automatically set its own apparatus number. As a result, the time required for the automatic setting can be saved, which contributes speed-up of the data transmission processing.

Moreover, the transmission section of the master apparatus 30 transmits a command for quantity recognition containing numerical value data for quantity count to be passed through all the plural slave apparatuses to either one of two slave apparatuses 40a and 40f in order to recognize the quantity of the plural slave apparatuses 40a to 40f. When the reception section of the slave apparatus 40 receives the command for quantity recognition from an adjacent slave apparatus, the corresponding transmission section adds "1" to the numerical value data for quantity count contained in the command for quantity recognition and transmits the command for quantity recognition to the other adjacent apparatus. The master apparatus 30 has the quantity recognition section 37 which recognizes the quantity (the number) of the plural slave apparatuses 40a to 40f on the basis of the numerical value data for quantity count contained in the command for quantity recognition received from the other slave apparatus 40a or 40f between the two slave apparatuses 40a and 40f, and the slave apparatus number determination section 38 which determines an apparatus number for each of the plural slave apparatuses 40a to 40f on the basis of the quantity (the number) recognized by the quantity recognition section 37. Accordingly, the master apparatus 30 can certainly set apparatus numbers of the plural slave apparatuses 40a to 40f without performing the automatic setting of apparatus numbers of the plural slave apparatuses 40a to 40f. As a result, it is possible to certainly carry out data transmission/reception among the master apparatus 30 and the slave apparatuses 40a to 40f.

The slave apparatus number determination section 38 determines apparatus numbers of the respective plural slave apparatuses 40a to 40f according to the quantity of the slave apparatuses 40a to 40f and the identification number retained in the identification number retention section 41. Accordingly, the slave apparatus number determination section 38 can accurately determine apparatus numbers according to operations of the slave apparatuses 40a to 40f.

[3] Modifications of the Invention

Note that the present invention is not limited to the above-described embodiments, but may be modified in various ways without departing from the spirit and scope of the invention.

[3-1] First Modification

Figure 9:
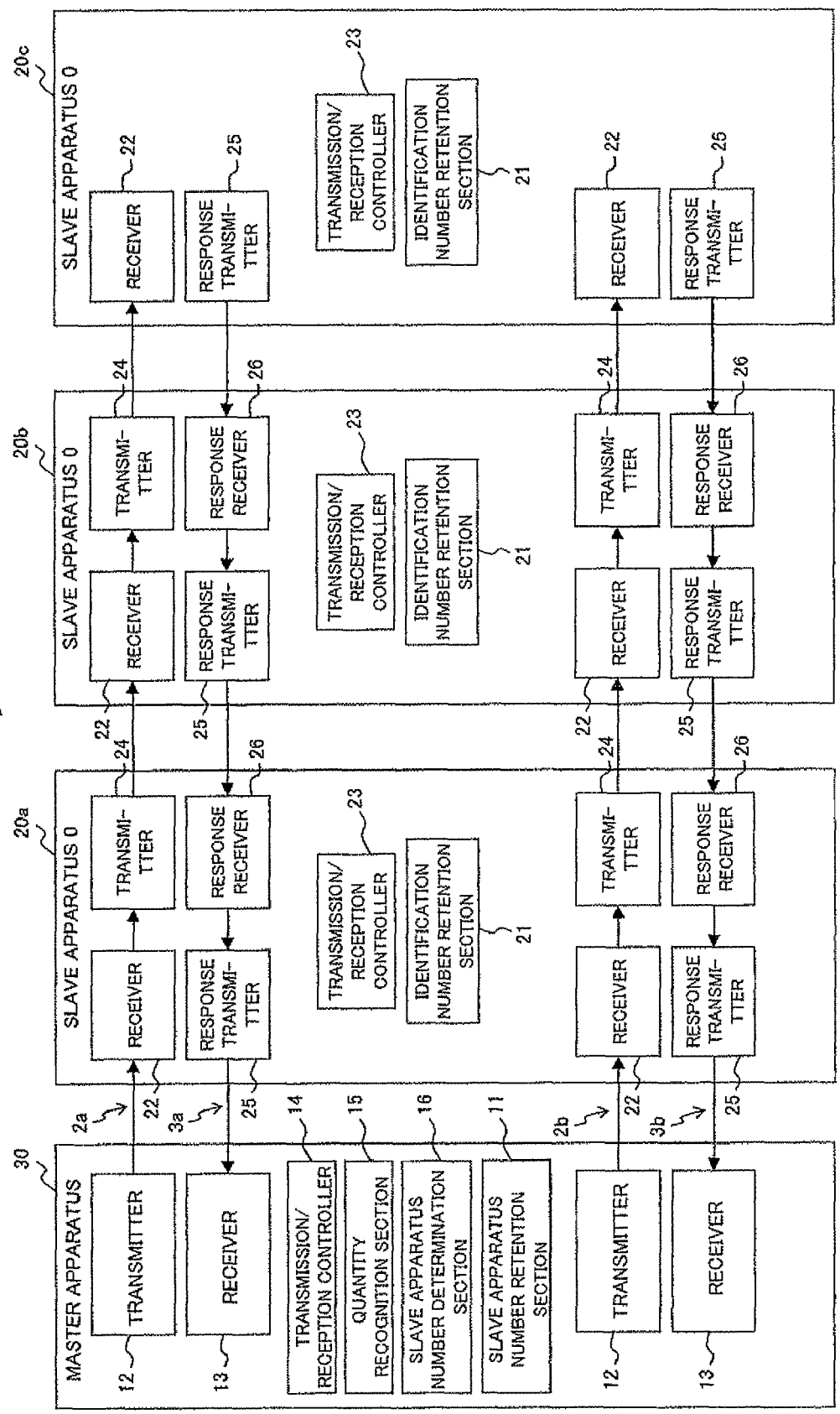
FIG. 9 is a block diagram illustrating functional configuration of a data transmission system according to a first modification of the present invention.

In the above-described first embodiment, the down transmission line (transmission line) from the master apparatus 10 which is the highest-ranked apparatus to the slave apparatus 20c which is the lowest-ranked apparatus via the slave apparatuses 20a and 20b is one, in reverse, the up transmission line from the slave apparatus 20c to the master apparatus line 10 is also one. However, the present invention is not limited to this example. As illustrated in FIG. 9, for example, a data transmission system 1c according to a first modification of this invention may have a plurality (here, two) of the down transmission lines and a plurality (here, two) of the up transmission lines.

In such case, one more set of the transmitter 12 and the receiver 13 is added to the master apparatus 10, one more set of the receiver 22, the transmitter 24, the response transmitter 25 and the response receiver 26 is added to each of the slave apparatuses 20a and 20b, and a set of the receiver 22 and the response transmitter 25 is added to the slave apparatus 20c.

In the data transmission system 1c, one down transmission line 2a and one up transmission line 3a are used as the current lines, while the other down transmission line 2b and the other up transmission line 3b are used as the stand-by lines to be used at the time of failure of the current lines.

Even if either one of the transmission lines 2a and 3a is disconnected at some point, it is possible to use the transmission lines 2b and 3b immediately, which can prevent harmful effects of the disconnection of the transmission lines 2a and 3a.

[3-2] Second Modification

Figure 10:
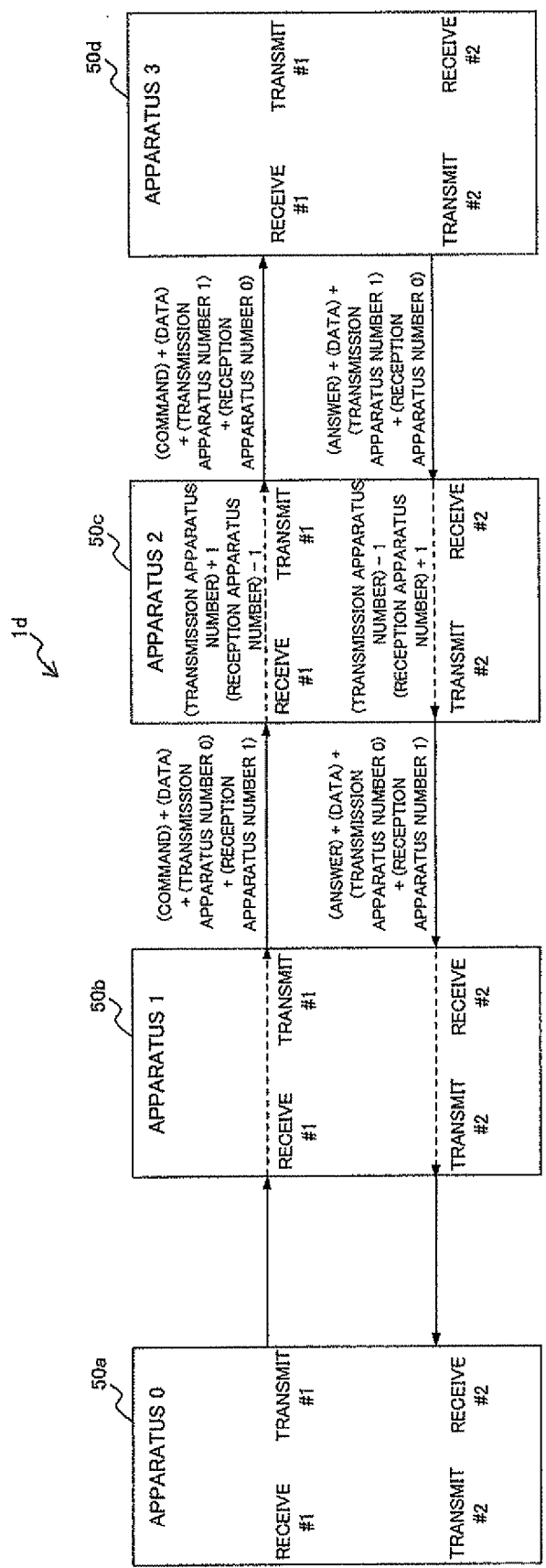
FIG. 10 is a diagram for illustrating a data transmission system according to a second modification of the present invention.
Figure 11:
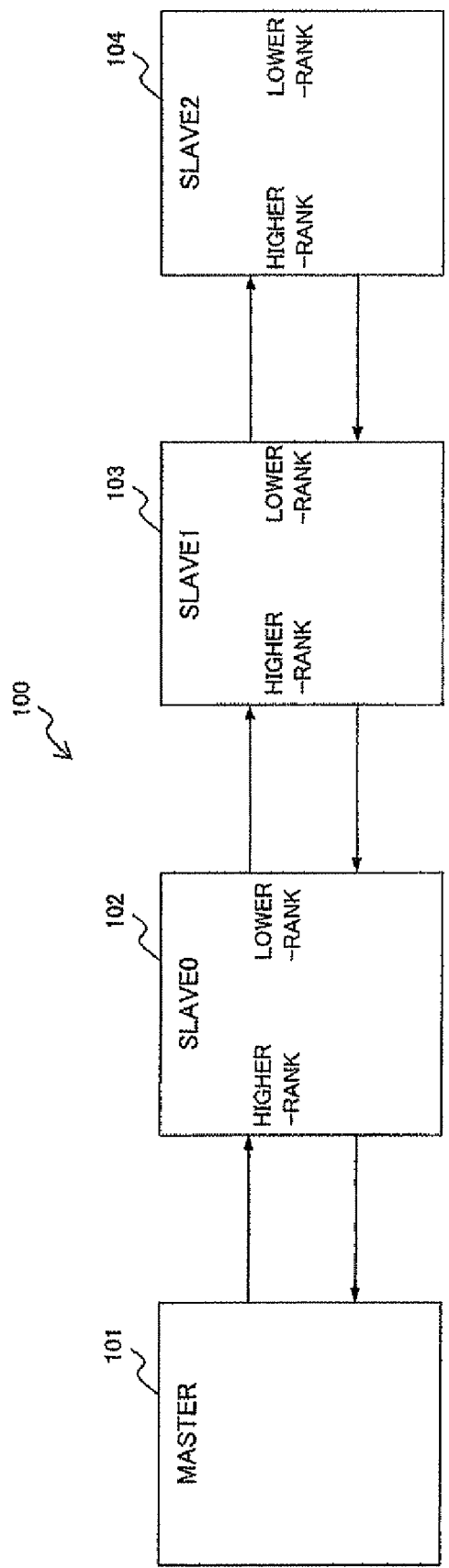
FIG. 11 is a block diagram illustrating a known data transmission system.
Figure 12:
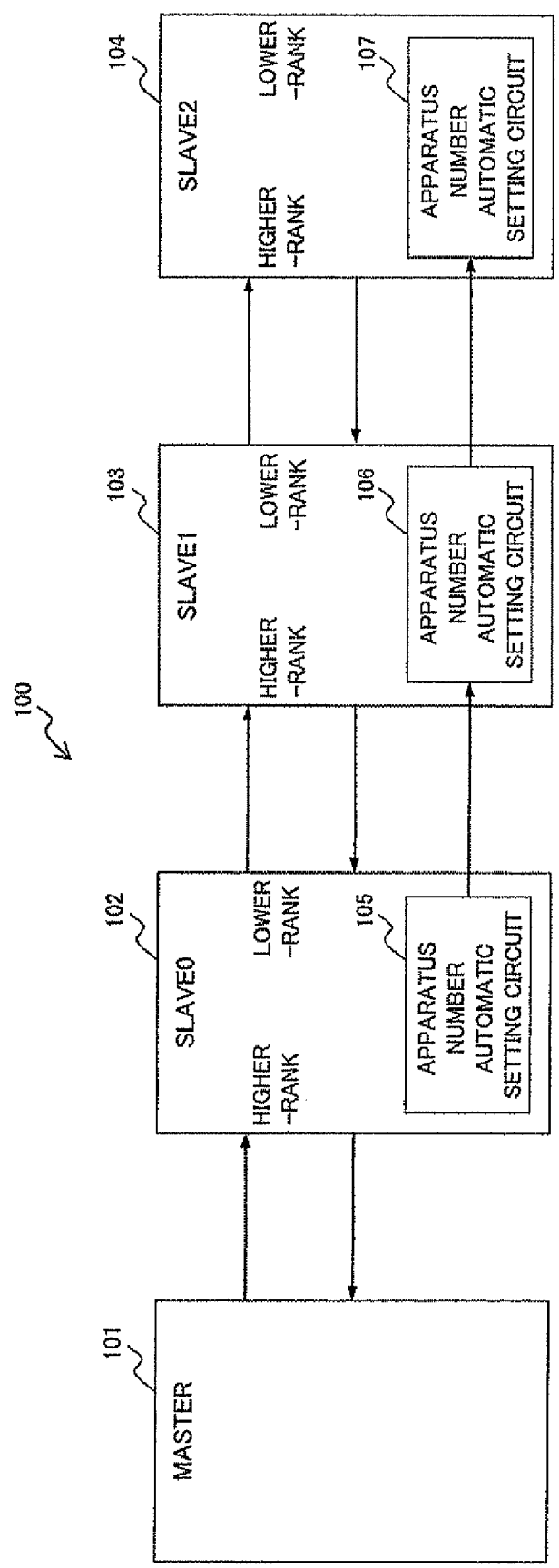
FIG. 12 is a block diagram illustrating another known data transmission system.

In the above-described first embodiment, one apparatus among three or more apparatuses connected in a cascade configuration is the master apparatus 10, and the other apparatuses are the slave apparatuses 20a to 20c. However, the present invention is not limited to this example. As illustrated in FIG. 10, for example, it is possible to configure a data transmission system id in which three or more apparatuses are connected in a cascade configuration so that data can be transmitted and received among all the apparatuses without discriminating the master apparatus from the slave apparatuses.

In such case, each of the apparatuses has both a functional configuration as the master apparatus and a functional configuration of the slave apparatuses 20a to 20c according to the above-mentioned first embodiment.

Further, each of the apparatuses 50a to 50d (hereinafter, referred to as an apparatus 50 when these apparatuses 50a to 50d are not discriminated from one another) attaches command information to data, and further a transmission apparatus number (identification number) and a reception apparatus number of the destination to data when functioning as the master apparatus transmitting the data, as same as the above second embodiment.

Like the above-described slave apparatuses 20a to 20c, the apparatus judges whether the data is destined for itself or not. When judging that the data is destined for another apparatus 50, the transmission/reception controller 23 adds "1" to the transmission apparatus number attached to the data, subtracts "1" from the reception apparatus number, and transmits the data to an apparatus 50 in the following stage.

When the apparatus 50 acting as the slave apparatus sends back response data to the apparatus 50b acting as the master apparatus, the apparatus 50 attaches answer information, together with a transmission apparatus number (number of the apparatus 50b that is the transmission destination) and a reception apparatus number (identification number) to the data, as does in the above-described second embodiment.

Each of the apparatuses 50a to 50d has to retain apparatus numbers of the apparatuses 50a to 50d in the slave apparatus number retention section 11 in order to specify a destination of data or response data.

The apparatus numbers of the apparatuses 50a to 50d are determined by the transmission/reception controller 14, the quantity recognition section 15 and the slave apparatus number determination section 16 in the method explained with reference to FIG. 3 or 4.

The data transmission system 1d according to the modification of the present invention can perform data transmission/reception between specific apparatuses without setting an apparatus number to every apparatus 50.

[3-3] Other Modifications

In the above first and second embodiments, the identification number retention section 21 of each of the slave apparatuses 20a to 20c or the identification number retention section 41 of each of the slave apparatuses 40a to 40f retains "0" as the identification number. However, the present invention is not limited to this example. It is required only that the identification numbers retained in the identification number retention sections 21 or 41 in all the slave apparatuses 20a to 20c or 40a to 40f be identical.

In the above-described first embodiment, when transmitting data to the lower-ranked apparatus, the transmitter 24 of each of the slave apparatus 20a to 20c subtracts "1" from the apparatus number. However, the present invention is not limited to this example. The value to be subtracted has not necessarily to be "1". The transmitter 24 may perform an addition process on the apparatus number, not the subtraction process.

In such cases, when transmitting response data to the higher-ranked apparatus, the response transmitter 25 has to execute the reverse process to the subtraction process or the addition process having performed by the transmitter 24, correspondingly to the process executed by the transmitter 24.

In the above-described first embodiment, three slave apparatuses 20a to 20c are connected to the master apparatus 10. However, the present invention is not limited to this example. In the present invention, the number of the slave apparatuses 20, that is, the number of stages in the cascade, is not limited, but slave apparatuses 20 in number other than three may be connected to the master apparatus 10.

In the above-described second embodiment, six slave apparatuses 40a to 40f are connected to the master apparatus to configure a ring-like data transmission system 1b. However, the number of the slave apparatuses 40 is not limited in the present invention. The ring-like data transmission system 1b may be configured with slave apparatuses 40 in number other than six.

In the above-described first embodiment, the master apparatus 10 has a configuration differing from that of the slave apparatuses 20a to 20c. However, the master apparatus 10 and the slave apparatuses 20a to 20c may have the same configuration.

Namely, the master apparatus 10 may have the receiver 22 and the response transmitter 25, as well, and the master apparatus 10 may be configured so that the transmission/reception controller 14 functions as the transmission/reception controller 23 and the slave apparatus number retention section 11 functions as the identification number retention section 21.

Then, an apparatus functioning as the master apparatus 10 recognizes that itself is the master apparatus from that no apparatus is connected to the connection section (connecting terminal or interface) on the higher-rank side thereof, thereby functioning as does in the above-mentioned first embodiment.

In other words, the slave apparatuses 20a to 20c may be ones that can function as the master apparatus 10. Concretely, when no higher-ranked apparatus is connected to the slave apparatus 20, the transmission/reception controller 23 thereof may function as the transmission/reception controller 14 in the slave apparatuses 20, the identification number retention section 21 may function as the slave apparatus number retention section 11, and the controller (control chip) in the slave apparatus 20 may function as the quantity recognition section 15 and the slave apparatus number determination section 16.

Therefore, it is unnecessary to manufacture the master apparatus 10 and the slave apparatuses 20a to 20c separately in order to accomplish the data transmission system 1a, which reduces the manufacturing cost because the master apparatus 10 and the slave apparatuses 20a to 20c in the same configuration can serve the purpose.

[4] Others

The functions as the transmitter 12, the receiver 13, the transmission/reception controller 14, the quantity recognition section 15,37, the slave apparatus number determination section 16,38, the receiver 22, the transmission/reception controller 23,35,46, the transmitter 24, the response transmitter 25, the response receiver 26, the first transmitter 31,43, the first receiver 32,42, the second transmitter 33,45 and the second receiver 34,44 can be realized by a computer (including a CPU, an information processing device, and various terminals) that executes a predetermined application program (data transmission program).

The program is provided in a form recorded in a computer-readable recording medium such as a flexible disc, CD (CD-ROM, CD/R, CD-RW, etc.), DVD (DVD-ROM, DVD-RAM, DVD-R, DVD-RW, DVD+R, DVD+RW, etc.), etc. In this case, the computer reads the data transmission program from the recording medium, transfers it to an internal storage device or an external storage device, and stores it for use. Further, the program may be recorded in a storage device (a recording medium) such as a magnetic disc, an optical disc, an opto-magnetic disc or the like and provided to a computer from the storage device via a communication line.

Here, a computer is a concept including hardware and an OS (operating system) and means hardware that operates under the control of the OS. Further, when hardware is operated with an application program alone without an OS, the hardware itself corresponds to a computer. Hardware is provided with at least a microprocessor such as CPU, and a means to read a program recorded in a recording medium.

An application program as the above-mentioned data transmission program includes program code for causing a computer to realize the functions as the transmitter 12, the receiver 13, the transmission/reception controller 14, the quantity recognition section 15,37, the slave apparatus number determination section 16,38, the receiver 22, the transmission/reception controller 23,35,46, the transmitter 24, the response transmitter 25, the response receiver 26, the first transmitter 31,43, the first receiver 32,42, the second transmitter 33,45 and the second receiver 34,44. Alternatively, part of the functions may be realized not by an application program but by an OS.

Furthermore, as the recording medium in the present embodiments, in addition to the flexible disc, CD, DVD, magnetic disc, optical disc, or opto-magnetic disc, a variety of computer-readable media such as an IC card, ROM cartridge, magnetic tape, punch card, internal storage device (memory as RAM, ROM, etc.) of a computer, an external storage device, and a printing on which code such as bar code is printed may be used.

All examples and conditional language recited herein are intended for pedagogical purposes to aid the reader in understanding the invention(s) and the concepts contributed by the inventor(s) to furthering the art, and are to be construed as being without limitation to such specifically recited examples and conditions, nor does the organization of such examples in the specification relate to a showing of the superiority and inferiority of the invention. Although the embodiment(s) has been described in detail, it should be understood that the various changes, substitutions, and alterations could be made hereto without departing from the spirit and scope of the inventions).

What is claimed is:

1. A slave apparatus in a data transmission system in which a plurality of slave apparatuses which are lower-ranked apparatuses are connected to a master apparatus which is the highest-ranked apparatus in a cascade configuration, comprising:
    an identification number retention section to retain the same identification number as other slave apparatuses;
    a receiver to receive data to which an apparatus number specifying one of said plural slave apparatuses is added from said master apparatus or other slave apparatus connected to the higher-rank side of said slave apparatus;
    a judgment section to judge that the data is destined for said slave apparatus itself when the apparatus number added to the data received by said receiver coincides with the identification number, whereas to judge that the data is destined for another slave apparatus when the apparatus number does not coincide with the identification number;
    a transmitter, when said judgment section judges that the data is destined for another slave apparatus, subtracts or adds a predetermined value from or to the apparatus number to change the apparatus number, adds the changed apparatus number to the data and transmits the data to another slave apparatus connected to the lower-rank side of said slave apparatus;
    a response transmitter to add the identification number as an apparatus number to response data to said master apparatus, and to transmit the response data to said master apparatus or another slave apparatus connected to the higher-rank side of said slave apparatus; and
    a response receiver to receive response data transmitted from said response transmitter of other slave apparatus connected to the lower-rank side of said slave apparatus;
    when said response receiver receives the response data from another slave apparatus connected to the lower-rank side of said slave apparatus, said response transmitter to add or subtract the predetermined value to or from the apparatus number added to the response data to change the apparatus number to reverse the subtracting or adding performed by said transmitter of said slave apparatus, to add the changed apparatus number to the response data, and to transmit the response data to said master apparatus or another slave apparatus connected to the higher-rank side of said slave apparatus.

2. A data transmission system in which a plurality of slave apparatuses which are lower-ranked apparatuses are connected to a master apparatus which is the highest-ranked apparatus in a cascade configuration, comprising:
    said master apparatus comprising:
        a slave apparatus number retention section to retain apparatus numbers for specifying said respective plural slave apparatuses; and
        a transmitter, in order to transmit data to one of said plural slave apparatuses, to transmit the data to which an apparatus number specifying said one of said plural slave apparatuses is added to a slave apparatus connected to said master apparatus;
    each of said slave apparatuses comprising:
        an identification number retention section to retain the same identification number as the other slave apparatuses;
        a receiver to receive the data from said master apparatus or another slave apparatus connected to the higher-rank side of said slave apparatus;
        a judgment section, when the apparatus number added to the data received by said receiver coincides with the identification number, judges that the data is destined for said slave apparatus itself, whereas, when the apparatus number does not coincide with the identification number, judges that the data is destined for another slave apparatus;
        a transmitter, when said judgment section judges that the data is destined for another slave apparatus, subtracts or adds a predetermined value from or to the apparatus number to change the apparatus number, adds the changed apparatus number to the data, and transmits the data to another slave apparatus connected to the lower-rank side of said slave apparatus;
        a response transmitter to add the identification number as an apparatus number to response data to said master apparatus, and to transmit the response data to said master apparatus or another slave apparatus connected to the higher-rank side of said slave apparatus; and
        a response receiver to receive response data transmitted from said response transmitter of another slave apparatus connected to the lower-rank side of said slave apparatus;
        when said response receiver receives the response data from said another slave apparatus connected to the lower-rank side of said slave apparatus, said response transmitter adds or subtracts the predetermined value to or from the apparatus number added to the response data to change the apparatus number to reverse the subtracting or adding performed by said transmitter of said slave apparatus, adds the apparatus number to the response data, and transmits the response data to said master apparatus or another slave apparatus connected to the higher-rank side of said slave apparatus; wherein
    said master apparatus further comprising;
        a transmission controller, to cause said transmitter to transmit information which is used for quantity recognition, and which is destined for at least lowest-ranked slave apparatus of all said plural slave apparatuses;
        a receiver to receive response data from said response transmitter of the lowest-ranked slave apparatus via the other slave apparatuses;

a quantity recognition section to recognize the quantity of said plural slave apparatuses on the basis of the apparatus number added to the response data from the lowest-ranked slave apparatus responding to the information for quantity recognition received by said receiver; and a slave apparatus number determination section to determine apparatus numbers of said respective plural slave apparatuses on the basis of the quantity of said plural slave apparatuses recognized by said quantity recognition section;

said slave apparatus number retention section of said master apparatus retaining the apparatus numbers determined by said slave apparatus number determination section.

3. The data transmission system according to claim 2, in said master apparatus:

the transmission controller, in order to recognize the quantity of said plural slave apparatuses, causing said transmitter to transmit data which is used for quantity recognition, and which is destined for all said plural slave apparatuses.

4. The data transmission system according to claim 2, in said master apparatus:

the transmission controller, in order to recognize the quantity of said plural slave apparatuses, causes said transmitter to transmit a command for quantity recognition requesting the lowest-ranked slave apparatus of said plural slave apparatuses to transmit the response data; and the quantity recognition section recognizes the quantity of said plural slave apparatuses on the basis of the apparatus number added to the response data from the lowest-ranked slave apparatus received by said receiver.

5. The data transmission system according to claim 2, wherein said master apparatus recognizes that the master apparatus itself is a master apparatus from the fact that no higher-ranked apparatus is connected to said master apparatus itself.

6. The data transmission system according to claim 3, wherein said slave apparatus number determination section determines apparatus numbers of said respective plural slave apparatuses according to the quantity of said plural slave apparatuses, the identification number and the predetermined value to be subtracted or added from or to the apparatus number by said transmitter of said slave apparatus.

7. The data transmission system according to claim 4, wherein said slave apparatus number determination section determines apparatus numbers of said respective plural slave apparatuses according to the quantity of said plural slave apparatuses, the identification number and the predetermined value to be subtracted or added from or to the apparatus number by said transmitter of said slave apparatus.

8. A data transmission method in a data transmission system in which a plurality of slave apparatuses which are lower-ranked apparatuses are connected to a master apparatus which is the highest-ranked apparatus in a cascade configuration, comprising the steps of:

transmitting data to which an apparatus number specifying one of said plural slave apparatuses is added from said master apparatus to a slave apparatus connected to the lower-rank side of said master apparatus in order to transmit the data from said master apparatus to said one of said plural slave apparatuses;

when the data is received by a slave apparatus from said master apparatus or another slave apparatus connected to the higher-rank side of said slave apparatus, judging in said slave apparatus that the data is destined for said slave apparatus itself if the apparatus number added to the received data coincides with the same identification number retained beforehand in said slave apparatus as the other slave apparatuses, whereas judging in said slave apparatus that the data is destined for another slave apparatus if the apparatus number does not coincide with the identification number, subtracting or adding a predetermined value from or to the apparatus number to change the apparatus number, adding the changed apparatus number to the data, and transmitting the data from said slave apparatus to another slave apparatus connected to the lower-rank side of said slave apparatus; and adding by said each of said plurality of slave apparatuses the identification number as an apparatus number to response data to said master apparatus;

transmitting by said each of said plurality of slave apparatuses the response data to said master apparatus or another slave apparatus connected to the higher-rank side of said slave apparatus;

receiving by said each of said plurality of slave apparatuses response data transmitted from another slave apparatus connected to the lower-rank side of said slave apparatus;

when the response data is received from said another slave apparatus connected to the lower-rank side of said slave apparatus, adding or subtracting by said each of said plurality of slave apparatuses the predetermined value to or from the apparatus number added to the response data to change the apparatus number to reverse the subtracting or adding performed at said-transmitting the data from said slave apparatus to another slave apparatus connected to the lower-rank side of said slave apparatus, adding the apparatus number to the response data, and transmitting the response data to said master apparatus or another slave apparatus connected to the higher-rank side of said slave apparatus; and transmitting by said master apparatus information which is used for quantity recognition, and which is destined for at least lowest-ranked slave apparatus of all said plural slave apparatuses;

receiving by said master apparatus response data from the lowest-ranked slave apparatus via the other slave apparatuses;

recognizing by said master apparatus the quantity of said plural slave apparatuses on the basis of the apparatus number added to the received response data from the lowest-ranked slave apparatus responding to the information for quantity recognition; and determining and retaining apparatus numbers of said respective plural slave apparatuses on the basis of the recognized quantity of said plural slave apparatuses by said master apparatus.

* * * * *